United States Patent
de Caussin et al.

(10) Patent No.: US 6,317,646 B1
(45) Date of Patent: Nov. 13, 2001

(54) CNC MACHINE HAVING INTERACTIVE CONTROL OF CORNER TOLERANCE THAT IS PROGRAMMED TO VARY WITH THE CORNER ANGLE

(75) Inventors: David Michael de Caussin; Glenn F. de Caussin, both of Northridge, CA (US)

(73) Assignee: Fadal Machining Centers, Inc., Chatsworth, CA (US)

(*) Notice: Subject to any disclaimer, the term of this patent is extended or adjusted under 35 U.S.C. 154(b) by 0 days.

(21) Appl. No.: 09/040,116

(22) Filed: Mar. 17, 1998

Related U.S. Application Data

(63) Continuation-in-part of application No. 08/820,102, filed on Mar. 19, 1997, now abandoned.

(51) Int. Cl.$^7$ .................................................. G06F 19/00
(52) U.S. Cl. ............................................ 700/173; 700/193
(58) Field of Search ................................... 700/172, 173, 700/175, 186, 187, 188, 193, 302, 303

(56) References Cited

U.S. PATENT DOCUMENTS

| | | | |
|---|---|---|---|
| 3,783,253 | 1/1974 | Anderson et al. | 315/568.1 |
| 4,503,373 | 3/1985 | Nozawa et al. | 318/570 |
| 4,510,427 * | 4/1985 | Nozawa et al. | 318/590 |
| 4,513,379 | 4/1985 | Wilson et al. | 700/181 |
| 4,591,771 | 5/1986 | Nozawa et al. | 318/569 |
| 4,591,968 | 5/1986 | Nozawa et al. | 700/181 |
| 4,600,985 * | 7/1986 | Nozawa et al. | 700/188 |
| 4,884,373 * | 12/1989 | Suzuki et al. | 451/5 |
| 4,907,164 * | 3/1990 | Guyder | 700/173 |
| 5,025,385 * | 6/1991 | Froyd | 700/169 |
| 5,083,280 | 1/1992 | Yamamoto et al. | 700/188 |
| 5,144,550 | 9/1992 | Sasaki et al. | 700/87 |
| 5,200,680 * | 4/1993 | Sasaki et al. | 318/571 |
| 5,416,716 | 5/1995 | Zeman et al. | 700/186 |
| 5,434,489 | 7/1995 | Cheng et al. | 318/568.15 |
| 5,453,674 * | 9/1995 | Seki et al. | 318/573 |
| 5,471,395 | 11/1995 | Brien | 700/186 |
| 5,493,193 * | 2/1996 | Seki et al. | 318/573 |
| 5,508,596 | 4/1996 | Olsen | 318/567 |
| 5,532,932 * | 7/1996 | Niwa | 700/188 |
| 5,563,484 | 10/1996 | Otsuki et al. | 318/568.15 |
| 5,604,677 | 2/1997 | Brien | 700/186 |
| 5,610,823 * | 3/1997 | Gregory | 700/173 |
| 5,631,851 | 5/1997 | Tanaka et al. | 702/33 |
| 5,682,319 | 10/1997 | Boland et al. | 700/189 |
| 5,892,345 * | 4/1999 | Olsen | 318/571 |

FOREIGN PATENT DOCUMENTS

| | | |
|---|---|---|
| 0579841 A1 | 1/1994 | (EP) . |
| WO 96/08752 | 3/1996 | (WO) . |

\* cited by examiner

*Primary Examiner*—William Grant
*Assistant Examiner*—Chad Rapp
(74) *Attorney, Agent, or Firm*—Blakely Sokoloff Taylor & Zafman LLP

(57) ABSTRACT

A CNC machine is programmed to redefine the corner tolerance as a function of the corner angle based on a recognition that corners having angles not equal to 90° have effective corner tolerances that are equal to the corner tolerance specified by the operator divided by the sine of the corner angle. An increase in machining speed is achieved, because, at corner angles not equal to 90°, the redefined corner tolerance is larger than the operator-specified corner tolerance and the CNC machine is permitted to machine the corner at an earlier time than conventional CNC machines. The CNC machine is also programmed to provide the operator with an interactive control of the parameters that control the speed and accuracy of machining. With this feature, the operator is able to observe the effects of changing the control parameters on the speed and accuracy of machining, and to customize the control parameters to a particular type of tool or application based on the observations.

21 Claims, 21 Drawing Sheets

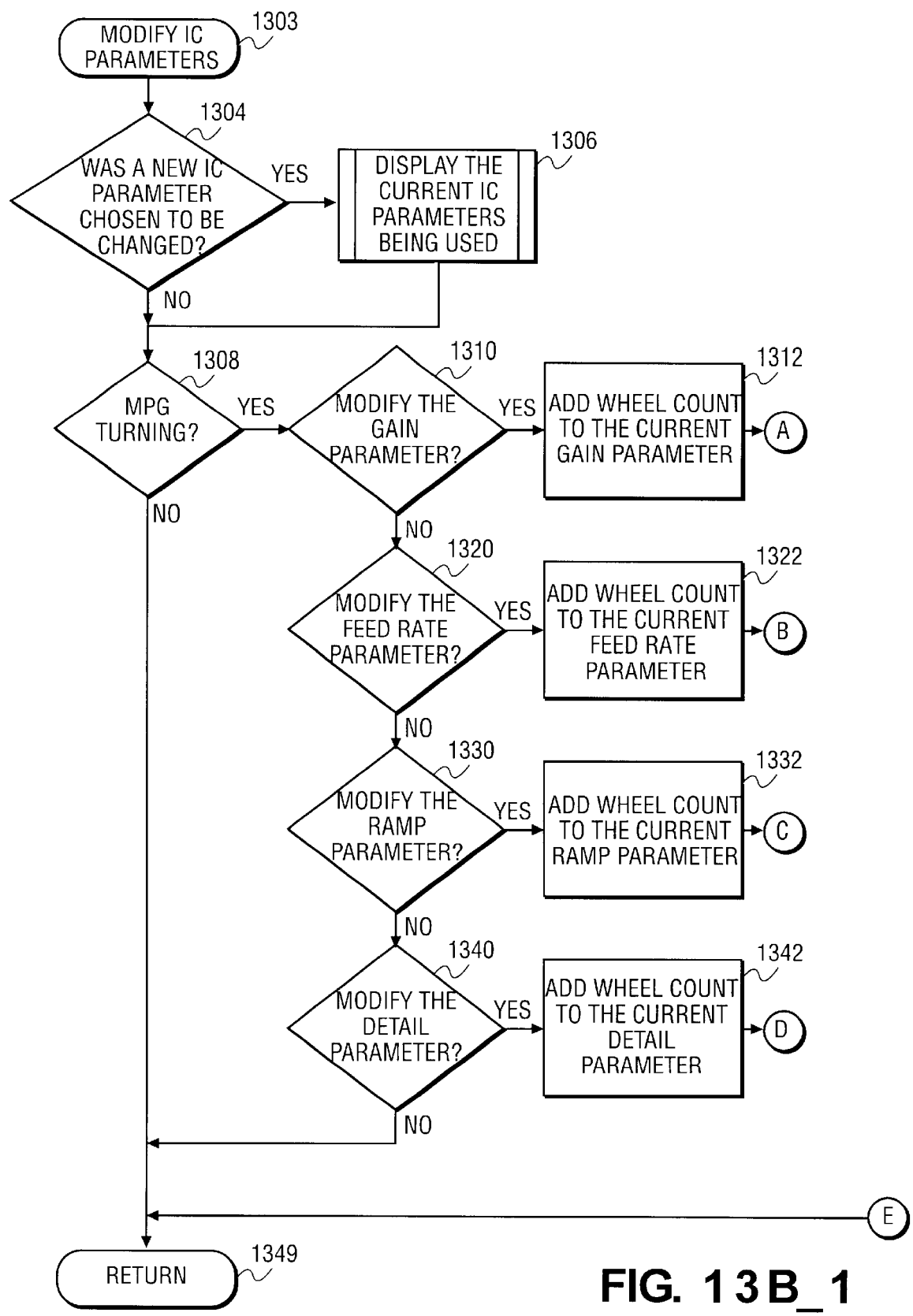
FIG. 13B_1

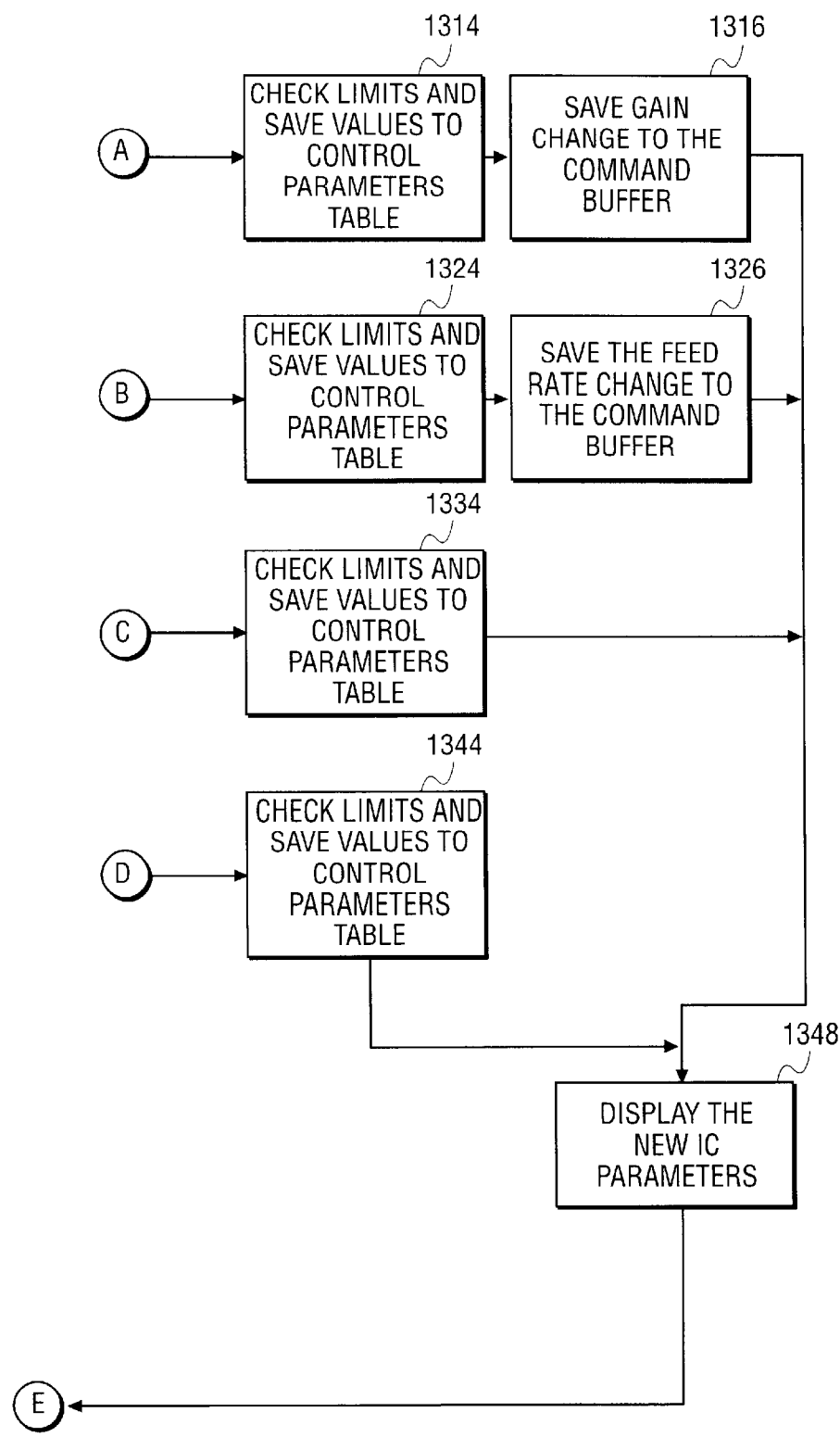
FIG. 13B_2

CNC MACHINE HAVING INTERACTIVE CONTROL OF CORNER TOLERANCE THAT IS PROGRAMMED TO VARY WITH THE CORNER ANGLE

RELATED APPLICATION

This application is a continuation-in-part of U.S. patent application Ser. No. 08/820,102, filed Mar. 19, 1997, now abandoned

BACKGROUND OF THE INVENTION

1. Field of the Invention

The present invention generally relates to positioning devices, such as computer numerical control (CNC) machines, coordinate measuring machines, and hexapod machining centers. More particularly, the present invention relates to a CNC machine having interactive control of a corner tolerance that is programmed to vary with the corner angle.

2. Description of the Related Art

In computer numerical control (CNC) machines, a workpiece is machined to a desired shape by moving a tool at a commanded speed along a machining path instructed by a machining program. The standard NC (numerical control) program, including G-codes and M-codes for controlling the path of the tool, has been used in the industry for years. It takes a relatively high degree of skill and a great deal of time to create such an NC-code program. Hence, programming errors often appear when the program is run for the first time.

The typical CNC machine requires a multistep process in order to manufacture a machined part. First, the machinist studies the blueprint and devises a method of manufacturing the part, determines which fixtures are needed to hold the part during manufacture, decides which tools are needed to machine the part, and chooses the order of the machining steps. Second, the NC-code program is created. Recently, various computer aided manufacturing (CAM) and computer aided design (CAD) systems have been developed to automate this process, but it is still done by hand in many facilities. The CNC machine program is typically generated using the well-known NC-code program language with G-codes and M-codes appearing in the format specified by EIA Standard RS-274-D. Third, the machine is set up as the operator mounts the holding fixture, references the zero position and establishes program coordinates, loads the NC-code program, and installs the tools used to manufacture the part. At this point, the machine is ready to begin the manufacturing process.

The manufacturing process begins when the operator pushes a start button on the operator control panel such as illustrated in FIG. 1. The operator cautiously watches as the machine proceeds during its initial run through the NC-code program. All too often, there is a program error or setup error which causes a "machine crash", i.e., a catastrophic collision that destroys the part, breaks the tool, and possibly damages the machine. To avoid such a crash, the operator must carefully watch the operation of the machine for undesired motions and see how the machine operates through the untested program execution. Once the first part is machined, the manufacture of the remaining parts is relatively straightforward, until the operator has to introduce a change or adjustment to either the NC-code or the CNC machine setup. Again, until the change is verified by running through the NC-code again, a costly mistake is always possible.

In an attempt to alleviate this setup problem, several CNC machine manufacturers have provided the operator with various procedures to utilize during the machine setup process. The most common is the "jog mode" of operation, wherein the operator utilizes a manual pulse generator (MPG) handwheel or a jog feed button on the machine control panel to manually move the tool head along an axis by turning the MPG handwheel in a manual jog mode of operation. This mode is primarily used with a multi-position selector switch to choose whether to "jog" the tool in the X, Y, or Z axis directions. Examples of various jog mode systems are shown in U.S. Pat. Nos. 4,510,427, 5,200,680, 5,453,674, and 5,493,193. These four U.S. patents are hereby incorporated by reference for their teaching related to the construction and operation of the manual pulse generator.

The majority of CNC machines simply utilize the MPG handwheel to move the tool head manually along an axis in the jog mode of operation. Some manufacturers also offer a remote jog handwheel option, so the operator can walk around to get a closer look at the workpiece during setup. Others utilize a "single step" button on the control panel in a single step state of operation, which executes only one block of NC-code and then stops until the start button is pressed to execute one more block of NC-code. Still other manufacturers utilize the MPG handwheel essentially as a kind of "automated start button" to single-step through several blocks of NC-code in succession. Although this may be useful in some mold-making applications where the NC-code is relatively simple, this does not provide adequate setup and test capability to ensure that the NC-code is error-free or that the manufacture of the part will not cause a machine crash.

Other controls commonly provide the operator with: (1) the ability to reduce the "rapid travel rate" of speed of the machine tool slides, typically between a predefined selection of speed reductions such as 5%, 25%, or 50%; (2) the ability to let the operator push a "slide-hold" button to stop the motion of the machine slides at any time during the operation of the program; (3) the ability to establish a trial feed rate modification using a "feed rate" potentiometer; and (4) an "emergency stop button" which is used to stop the CNC machine if an accident occurs. The operator can utilize a combination of these buttons or knobs to set up the machine and slow it down during initial operations. However, a series of buttons can present a confusing situation to a novice operator, particularly when observing the operation of the machine and not watching the control panel.

All of these methods provide the operator limited ability to intervene during the setup procedure. More importantly, however, they do not allow the operator to actually run through the NC-code program steps at a controlled speed and direction. They only provide the operator with a series of buttons or knobs to either stop all processes or reduce certain predefined forward feed rates or travel rates of the machine. As such, the operator does not have optimum control to verify each part program the first time it is run, i.e., to provide a "true dry-run" of the manufacturing process. If the operator needs to modify the NC-code program, the operator must stop the process, make the edit, and manually restart the program at a desired position. Once again, the modified program would have to be carefully checked to verify the changes.

Another drawback of conventional CNC machines is their inability to machine corners of a workpiece to a specified tolerance with speed and accuracy. FIGS. 2A–2C illustrate three different examples of how conventional CNC machines carry out the machining of a programmed path P having a corner C to a specified tolerance δ. In the following examples, the deviation from the programmed path P by the actual machining path is indicated by a solid arrow A.

In the first example shown in FIG. 2A, the tool follows a desired position that is incrementally updated along a programmed path P. When the desired position of the tool is at the corner C of the programmed path P, the desired position does not advance beyond this corner until the tool's actual position comes within the specified tolerance δ of this corner. When the tool's actual position is within the specified tolerance δ, the desired position advances beyond the corner C and the tool follows the path A.

On the other hand, if the tool's actual position is outside the specified tolerance δ, the desired position waits at the corner C for the tool's actual position to catch up. If the desired position advances beyond this corner without waiting for the actual position to sufficiently catch up, the specified tolerance at the corner will not be satisfied, because, as a result, a cut indicated by the dashed arrow A' will be made.

In the second example shown in FIG. 2B, the desired position is permitted to deviate from the programmed path and to advance past the corner C of the programmed path. This is done to allow the actual position of the tool to reach the corner C much more quickly than the example of FIG. 2A. However, in the method of FIG. 2B, the actual path A often deviates beyond the corner C before returning to the programmed path around the corner C, and, as a result, too much material is left at the corner.

In the third example shown in FIG. 2C, the actual path A of the tool includes a loop path that is defined at the corner C of the programmed path, such that the tool cuts along one side of the corner, moves around the loop path, and then cuts along the other side of the corner.

The conventional CNC machines that carry out machining of corners in accordance with the above examples, however, have the following disadvantages. The CNC machine operating according to the first example has slow throughput. The CNC machine operating according to the second example often leaves too much material at the corners as shown in FIG. 2B. The CNC machine operating according to the third example requires complex programming to define the actual path A of the tool to have loop paths at the corners.

Moreover, in conventional CNC machines, once the program for the move is executed, parameters defined in the program for controlling the speed and accuracy of machining corners are, for the most part, not adjustable. The ability to control feed rates using a potentiometer is an exception, but the control is very limited. The feed rate can be changed only within a certain predefined range, e.g., between 0% and 150% of the programmed value.

Therefore, when an operator of a conventional CNC machine desires to change any of the control parameters for machining corners, the operator must first stop the machine and enter the change as a program change before the new parameters will be recognized by the CNC machine.

SUMMARY OF THE INVENTION

Accordingly, it is a general object of the present invention to provide a CNC machine that overcomes the aforementioned disadvantages.

It is a more particular object of this invention to provide a method of controlling a CNC machine to machine a workpiece with increased speed.

It is another object of this invention to provide a method of interactively controlling parameters that affect speed and throughput of a CNC machine.

It is still another object of this invention to provide a CNC machine having a programmable control unit that controls movements of a tool relative to a workpiece to machine a corner portion of the workpiece to a specified tolerance with increased speed.

It is yet another object of this invention to provide a CNC machine with an interactive user interface and a handwheel to permit an operator to customize the control parameters of the CNC machine during its operation.

It is still another object of this invention to provide a table of control parameters that stores preferred control parameter values for different types of tools.

It is yet another object of this invention to provide an operator with a "dry-run" mode of operation that allows the testing of the actual NC-code program to be executed in a controlled manner under actual manufacturing conditions.

The present invention provides a CNC machine that is programmed to redefine the corner tolerance in accordance with the angles of the corners to be machined. Preferably, the corner tolerance is redefined to be equal to a corner tolerance specified by the operator divided by the sine of the angle of the corner, but can be any distance between the specified tolerance and the distance value derived in the above manner. An increase in speed is achieved because the redefined corner tolerance is generally larger than the specified tolerance and the CNC machine is permitted to machine the corner at an earlier time than conventional CNC machines.

The CNC machine according to the invention includes a programmable control unit (PCU) and a drive assembly for executing the above-described process to cut a workpiece into a desired shape in the following exemplary manner. First, the PCU determines a desired position of the cut along a programmed path that is ahead of the cut's current position. Then, the drive assembly produces a desired velocity signal in each of the controlled axes based on the difference between the desired position and the current position, and controls the actual velocity of the cut to be equal to the desired velocity.

The CNC machine according to the invention also permits the operator to adjust certain control parameters of the cut interactively during the cut without stopping the machine. The interactive control (IC) parameters are: (i) GAIN, (ii) RAMP TIME, (iii) DETAIL, and (iv) FEED RATE.

GAIN is a parameter of the drive assembly that is representative of the responsiveness of the drive assembly to the difference between the desired and current positions. An increase in the gain speeds up the cutting process, but makes the CNC machine susceptible to position overshoots.

RAMP TIME is used by the PCU to specify the linear rate of change between different programmed feed rates. For example, if the programmed feed rate changes from 5 in/sec to 10 in/sec between moves, the PCU increases the programmed feed rate gradually from 5 in/sec to 10 in/sec in the amount of time specified by the ramp time. A decrease in the ramp time speeds up the cutting process, but a ramp time that is too small makes the machine susceptible to sudden starts and stops (i.e., jerky motion), and increases the wear on the machine components.

DETAIL is a parameter that specifies how closely corner portions of the workpiece are to be machined. A finer detail results in a more precise corner cut, but slows down the overall machining process. In this application, detail is also referred to as corner tolerance, and the two terms are used interchangeably throughout.

FEED RATE is a parameter that the operator controls to adjust the programmed feed rate for the moves remaining in the program. However, once this feed rate has been set, it is overridden by any feed rate that is subsequently defined in the program. An increase in the feed rate speeds up the cutting process, but a feed rate that is too large makes the machine susceptible to sudden starts and stops (i.e., jerky motion), and increases the wear on the machine components.

In the CNC machine according to the invention, the GAIN, RAMP TIME, DETAIL, and FEED RATE are adjusted using an interactive user interface and an MPG handwheel. The interface is responsive to a keyboard interrupt and prompts the operator for a choice of one of the four control parameters. The MPG handwheel is rotated to adjust the value of the selected parameter. A clockwise rotation increases the value whereas a counterclockwise rotation decreases the value. The amount of increase or decrease is proportional to the amount of rotation of the handwheel.

The interactive control permits the operator to customize the control parameters to a particular type of tool or application. For example, if a roughing cut is desired, the operator sets the DETAIL parameter to a large value, thereby increasing the speed of the cut. On the other hand, if a finishing cut is desired, the operator sets the DETAIL parameter to a small value, thereby improving the preciseness of the cut. In conventional CNC machines, by contrast, the DETAIL is fixed at one value and either speed or precision, or both are compromised.

The CNC machine according to the invention also includes a tool for carrying out the cutting function and a platform for supporting the workpiece during the cut. Either the tool or the platform may move to perform the cut. All that is required is relative motion between the two. In the preferred embodiment, the platform moves in the X and Y axes and the tool moves in the Z axis.

The CNC machine according to the invention maintains the table of control parameters in which preferred control parameter values for different types of tools are stored for future use. When a particular tool is selected by the CNC machine, the control parameters table is accessed and the CNC machine is initialized with the preferred values of GAIN, RAMP TIME, DETAIL, and FEED RATE that are stored in the table.

Additional objects, features, and advantages of the invention will be set forth in the description of preferred embodiments which follows.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings in which:

FIGS. 13A–13C represent a flowchart showing the sequence of steps that are performed when an NC block is processed in either Step 406 or Step 422 of FIG. 7;

DETAILED DESCRIPTION OF THE PREFERRED EMBODIMENTS

Figure 1:
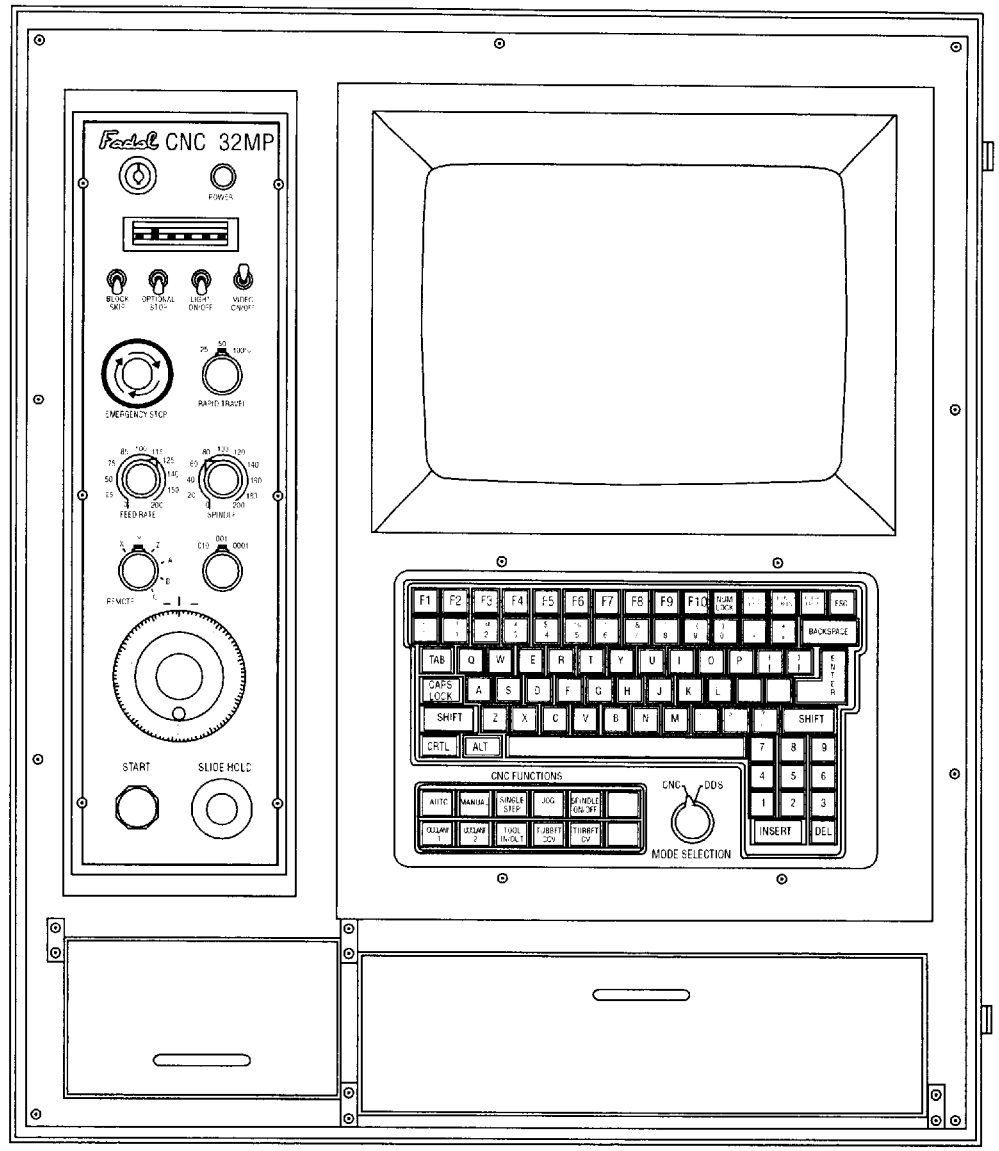
FIG. 1 is a front view of a CNC machine tool pendant, showing the operator control panel.
Figure 2A:
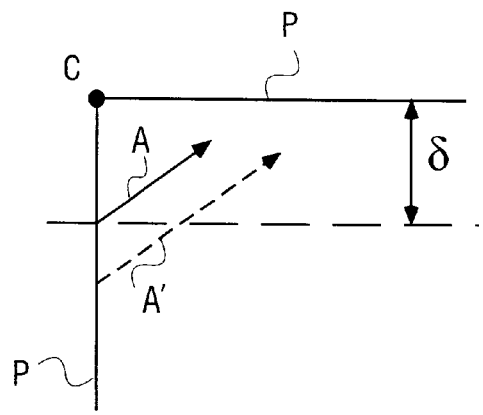
FIGS. 2A–2C illustrate the cutting paths resulting from three conventional methods that are used in machining a corner of a workpiece.
Figure 2B:
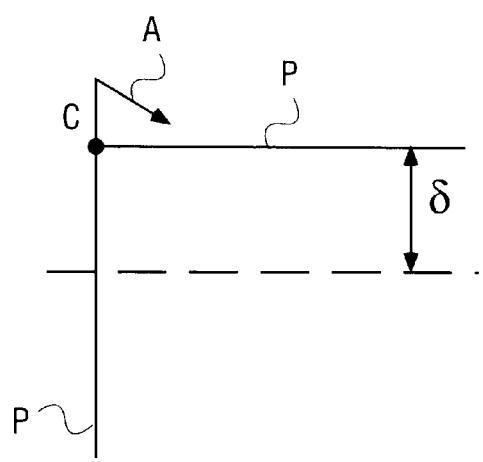
Figure 2C:
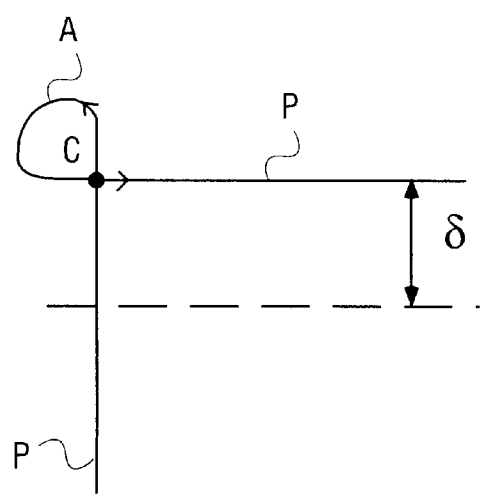
Figure 3:
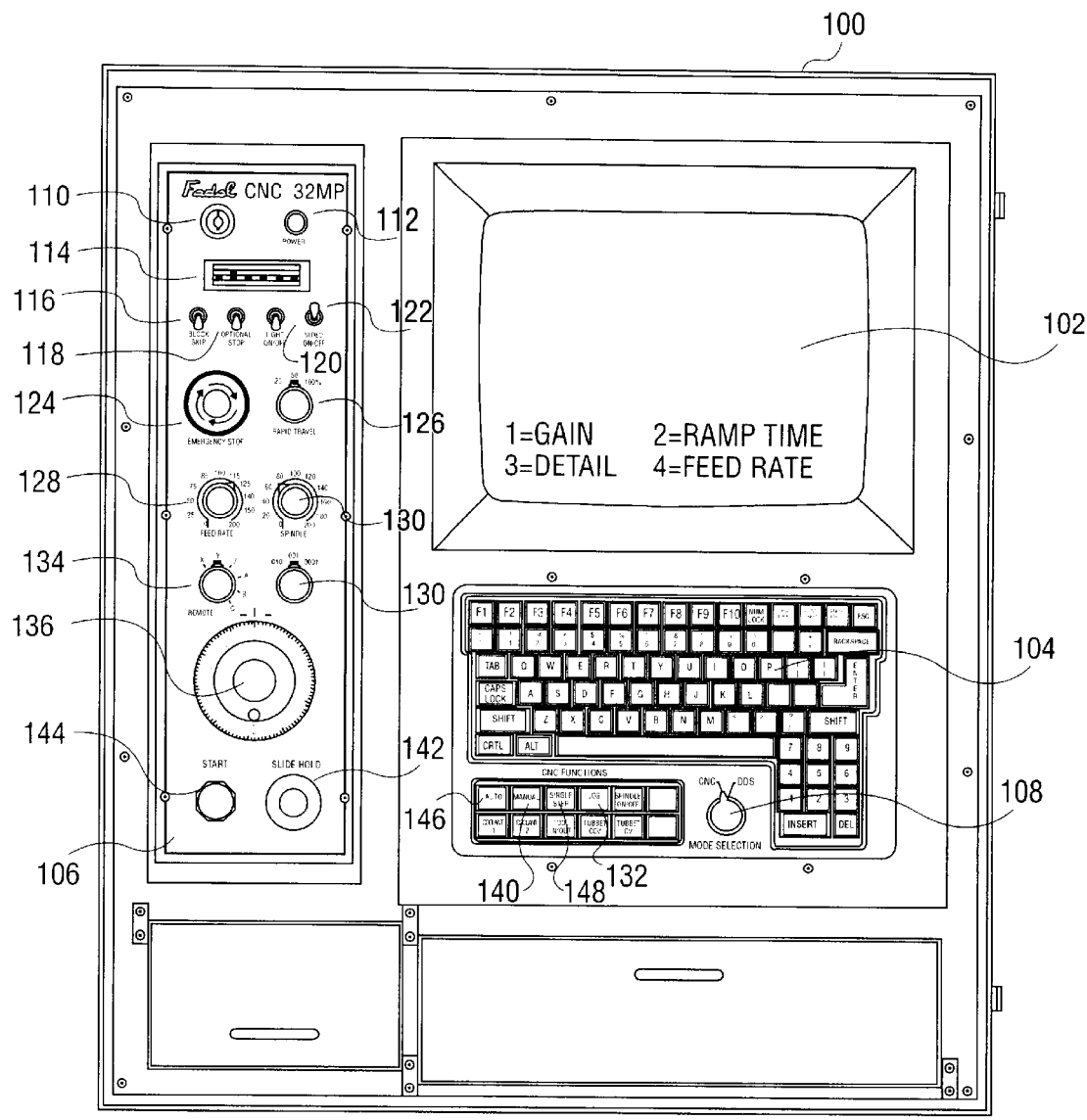
FIG. 3 illustrates the control panel of FIG. 1 showing a sample user interface display that prompts the operator to select one of four control parameters according to the invention.

Referring now to FIG. 3, an operator's panel or "pendant" 100 is shown for the Fadal CNC Model 32 MP Vertical Machining Center (VMC), which can be used with the present invention. The Model 32 MP VMC contains an embedded PC-compatible computer. The computer uses the familiar MS-DOS or Windows operating systems in the DOS platform mode, and uses a battery-backed CNC memory in the CNC platform mode. Moreover, several programs that CAD/CAMs generate for complex parts can easily be stored and run directly from the DOS platform via direct numeric control (DNC). A DNC command is used to cause the CNC machine to directly execute NC-code as it received from its RS-232 port.

Except for such remote DNC control, all operations of the VMC are controlled from the pendant 100, which is comprised of a video display 102, a keyboard 104, and a control panel 106. The video display 102 provides visual feedback to the operator, showing tool position parameters on all the axes, various status messages to the operator, as well as the actual NC-code part program in different modes of operation. Several CNC function keys are shown on the keyboard 104, as well as a "CNC/DOS" mode selection switch 108. When switch 108 is in the CNC position, the CNC machine will be in one of the following modes of operation: (1) command mode; (2) automatic mode; (3) editor mode; (4) manual data input (MDI) mode; (5) jog mode; and (6) MPG dry-run mode. These modes, and the function keys used to control these modes, will be explained in detail below.

At the top of the control panel 106 is a KEY LOCK switch 110 which enables or disables the NC-code program editing mode. The POWER light 112 indicates whether power has been turned on or off to the entire VMC. A LOAD METER 114 measures the power to the spindle motor, such that an overload condition does not occur. For example, at 100%, the spindle motor can be operated continuously, but at the 150% level, it can be sustained for no more than five-minute intervals. Four toggle switches 116–122 are located below the load meter. When the BLOCK SKIP switch 116 is activated, the NC-code program is allowed to read the skip symbol "/" embedded in a block of NC-code and skip the block. When BLOCK SKIP is turned off, the program ignores the skip symbol and executes the program block. The OPTIONAL STOP switch 118 causes the CNC to stop at the M1 optional program stop function code and enter the waiting state. This M1-code might have been included in an NC-code program for the convenience of the operator to allow the program to stop at certain points. The M1 function code is ignored when the OPTIONAL STOP SWITCH 118 is turned off. The LIGHT ON/OFF switch 120 controls power to the work lamp, and the VIDEO ON/OFF switch 122 controls power to the video display monitor 102.

The EMERGENCY STOP switch 124 is used to shut down the CNC machine's slides and spindle. When activated, the machine will be put into the command mode, and the machine can be reactivated by resetting the EMERGENCY STOP button and pressing a particular key. The RAPID TRAVEL selector switch 126 is used to select the percentage of the maximum rapid traverse rate during certain NC-code movements. Either 25%, 50%, or 100% of maximum rapid traverse can be selected for NC-codes "G0" and "G5", which are used when the tool is moved from one point to another point whenever machining is not taking place. The FEED RATE adjustment potentiometer 128 controls the speed of axis motion, depending upon the different modes of operation. In the automatic mode, axis motion can be increased to 150% or reduced to 0% of the programmed feed rate, although rapid travel rates are not affected. In the single step state of operation, all axis motion is controlled by the FEED RATE potentiometer 128. The SPINDLE speed override potentiometer 130 controls the programmed spindle speed in RPMs. The maximum override is 200% of the last programmed spindle speed executed by the NC-code program.

One of the CNC function keys is called a JOG key 132. Pressing the JOG key 132 while in the command mode, or during the waiting state while in the auto mode, initiates the jog mode. Once in the jog mode, the operator can select an axis to "jog" by turning the axis selector switch 134 or by pressing the X, Y, Z, A, B, or C keys on the keyboard 104. As per EIA Standard RS-267-B, the A direction is rotation about the X axis, the B direction is rotation about the Y axis, and the C direction is rotation about the Z axis. The jog direction is selected by either the "+" or "−" key on the keyboard 104, or by the direction of rotation of the MPG handwheel 136, wherein clockwise is positive and counterclockwise is negative. The distance increment of jog axis motion is selected by pressing the H, M, or L key (high, medium, or low) on the keyboard 104, or by turning the jog increment selector switch 138, wherein H=0.01, M=0.001, and L=0.0001 inches. Short moves may be made by pressing the JOG key 132 repeatedly, or by turning the MPG handwheel 136. Continuous forward motion can be performed by holding down the JOG key 132. The speed of this motion may be modified by adjusting the FEED RATE adjustor 128. This override can be used only when the JOG key is held for jog motion, since it does not affect the speed when using the MPG handwheel 136. The jog mode is exited when the operator presses the MANUAL function key 140 on the keyboard.

The SLIDE HOLD button 142 is used to temporarily pause operation of the current movement of the slides and stop their movement along the axes. Once activated, a "distance to go" message will be displayed, showing the length to complete the current move. Although this slide hold state stops movement of the machine slides along all axes (X, Y, Z, A, B, and C), the spindle and coolant are not affected by the SLIDE HOLD. After pressing the SLIDE HOLD button 142, the completion of the current move is subject to the FEED RATE adjuster 128 when the START button 144 is pressed.

The CNC machine initially waits in the command mode for the operator to provide some command or instruction to the device. The AUTO function key 146 initiates execution of the current NC-code program in the automatic mode. Upon pressing the AUTO key in the command mode, the CNC machine displays the current status of the manual modes, and then prompts the operator to press AUTO to continue or MANUAL to change modes. Pressing the AUTO key again initiates NC-code program processing. If the AUTO key is pressed while the control is processing, the machine enters a waiting state. The program continues to process information until the command buffer is filled. When the machine enters the waiting state, the NC-code program may be executed by pressing the START button 144.

The SINGLE STEP function key 148 issues the single step command which causes the CNC machine to enter the waiting state between each block of NC-code. While in this single step state, all rapid moves are subject to the FEED RATE override potentiometer 128. While in the single step state, the START button 144 executes one block of NC-code, then stops. Pressing the MANUAL key 140 interrupts the current activity and returns the controller to the command mode. Pressing the AUTO key cancels the single step state and returns the operation to the normal auto mode.

Most CNC machine movements are programmed using certain G-codes, which specify the distance travelled and rate of travel. Linear interpolation is used to generate motion between points on a line at a specified feed rate. A linear move is established using the "G1" code. For example, the NC-code block "N3 Z-1. G1 F100." is interpreted to mean "block number N3 should move the tool linearly in the negative Z direction 1.0 inch at 100.0 inches per minute". However, the NC-code block "N7 X1. Y1. G1" moves the X and Y axes together forming an angular cut. Hence, the G-codes are divided into groups of families to distinguish which codes can function simultaneously in a program. Codes belonging to a similar group cannot function together, while codes from different groups or families can function together.

As stated above, the jog mode can be operated using the keyboard 104 as follows: the operator presses the JOG key to enter the jog mode; the operator selects the axis to be jogged by pressing the corresponding letter (X, Y, Z, A, B, or C) from the keyboard or the X-Y-Z selector switch; the operator selects the direction to jog the tool using the "+" or "−" keys on the keyboard; the operator selects the increment to be jogged by typing H, M, or L (0.01, 0.001, or 0.0001 inch); and each time the JOG key is pressed, the machine slide will move in the direction and increment specified. The axis, direction, and increment will be displayed in the video screen.

Alternatively, the MPG handwheel 136 can be used in the jog mode as follows: the operator would press the JOG function key 132 to get into the jog mode; the operator would select the axis to be jogged using the axis selector switch 134; the operator would select the increment to jog the slide along the selected axis using the increment selector switch 138; the operator would turn the MPG handwheel 136 in a clockwise direction to move the slide in a positive direction, and/or move the handwheel in a counterclockwise direction to move the slide in a negative direction. The MPG handwheel has detents or "clicks" for each increment. In the preferred embodiment, the MPG has one-hundred clicks per one full 360° rotation of the handwheel. As will be seen below, these clicks may be counted or calculated to make the desired moves. The jog status is always displayed in the video screen.

A "dry-run" procedure is normally used to setup and test the CNC machine. This procedure is usually performed by the NC-code programmer, since changes to the NC-code are usually made at this time. It is referred to as a "dry-run" because the workpiece material is not cut. Hence, the term "dry-run" can be defined as the initial run-through of the NC part program after a parameter has been changed wherein the operator is uncertain exactly how the machine will move in response to the untested NC-code.

The CNC machine provides an additional MPG dry-run mode which allows the operator to interactively control the CNC machine operation at variable speeds within a block of NC-code, as well as through both the forward and reverse directions within the single NC-code block and among several blocks of NC-code. This includes the ability to stop the machine operation at any time, even within a block of code, by stopping movement of the MPG handwheel.

To operate in the MPG dry-run mode, the operator must first pause the machine by pressing the SLIDE HOLD button 142. Then, an operation of the MPG handwheel 136 initiates the MPG dry-run mode, so when the operator turns the MPG handwheel 136 in a clockwise direction, the machine steps forward through the NC-code, and when the operator turns the MPG handwheel 136 in a counterclockwise direction, the machine steps backwards through the NC-code. As before, the machine status, tool position, and current NC-code block are displayed in the video screen.

An MPG dry-run mode increment selector switch 138 controls the responsiveness of the machine to the rotation of the MPG handwheel 136. At the Low Speed setting, the speed of the machine movement is directly proportional to the speed that the MPG handwheel is turned, while at the Medium or High Speed settings, the speed of the machine movement is one-half times or one times the rate of speed programmed by the NC-code, respectively, so long as the MPG handwheel is being turned at any rate which exceeds a certain threshold. This threshold will be explained in detail below. This was done for convenience of the operator, since it was only deemed necessary to have one low-speed proportional rate control setting, and since it was more desirable to have two fixed-rate variations of the programmed speed rate than two additional higher-speed control settings for the proportional rate. However, as will be seen below when describing the flowcharts, the latter speed configuration could also readily be accomplished.

Hence, the MPG dry-run mode provides a pulse-by-pulse interactive control for the entire CNC machine through the use of the single MPG handwheel, wherein the speed and direction of rotation of the handwheel directly correspond to the speed and direction of operation of the machine tool. No other controls are needed in this MPG dry-run mode. For example, if the G-code line was "N3 G1 X10. Y10. F100.", the operator may manually control the speed, direction, and stopping of this 10-inch X-axis linear movement and 10-inch Y-axis linear movement at any time and at any position along the 45° diagonal 14.142-inch path by manual control of the MPG handwheel. The operator could move very slowly for the first one-quarter inch of the movement, speed up for the next two inches, stop the movement, reverse one-half inch along the path, stop again, and then continue through the rest of the move. In other words, the MPG dry-run mode allows the operator to provide total interactive control of all motions of the machine by using the actual NC-code that will be used to operate the machine after a successful dry-run. This would not be the case using the single step state of operation, since it can only step through the entire block of NC-code by starting and completing the entire move at the speed determined by the feed rate adjustment potentiometer. In the NC-code block N3 above, this would mean that the machine would complete the entire 14.142 inch movement, unless the operator stopped it using the slide hold button.

When the operator needs to make a correction to the NC-code program when using the MPG dry-run mode, he or she simply stops the movement of the MPG handwheel, and changes the NC-code program data in memory using the background editor mode. Once changed, the operator simply continues with the MPG dry-run mode by moving the MPG handwheel.

The present invention permits an operator to adjust the following four interactively-controlled (IC) parameters of the CNC machine: (1) GAIN, (2) RAMP TIME, (3) DETAIL, and (4) FEED RATE "on the fly," i.e., interactively, while the system is executing a programmed move. The IC parameters are adjusted by: (i) operating the keyboard 104 during execution of the programmed move to bring up the interactive user interface on the display 102 as illustrated in FIG. 3; (ii) selecting one of the four control parameters for adjustment; and (iii) turning the MPG handwheel 136 clockwise or counterclockwise to adjust the selected control parameter up or down, respectively. Consequently, with the invention, the operator is able to optimize or individualize the above control parameters for a particular machining process without stopping the machine.

As shown in FIG. 3, when the control parameter is selected, its value is shown on the display 102. The value that is displayed is either its default value or the most recent program-defined or user-adjusted value. The amount of increase or decrease is proportional to the amount of rotation of the MPG handwheel 136. Also, the control parameters table associated with the particular tool that is mounted in the CNC machine is updated with the most recent user-adjusted value. Therefore, when the CNC machine accesses this tool at a later time, the preferred IC parameter values that are stored in the control parameters table for this tool are loaded, and the CNC machine is initialized with the values of GAIN, RAMP TIME, DETAIL, and FEED RATE as specified in the table.

Figure 4A:
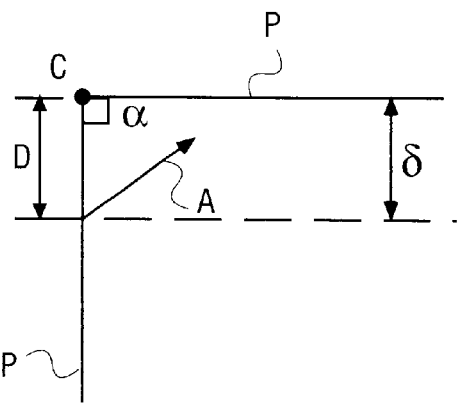
FIGS. 4A–4C illustrate the cutting paths resulting from the method that is used in the invention to machine a corner of a workpiece.
Figure 4B:
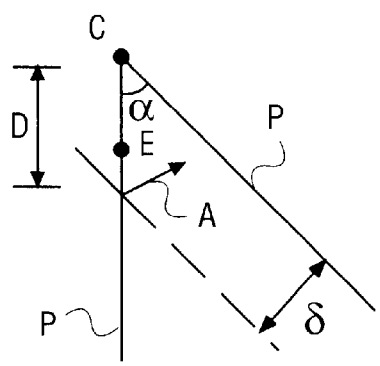
Figure 4C:
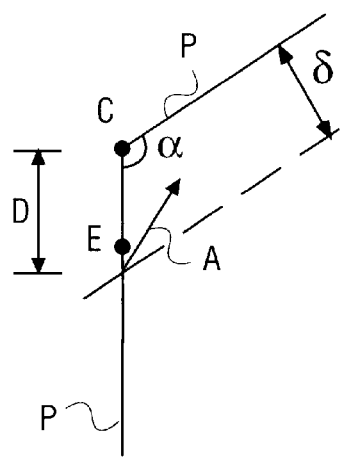

FIGS. 4A–4C illustrate the machining method according to the invention. FIG. 4A shows an example of cutting a 90° corner to a specified detail and FIGS. 4B and 4C show, respectively, examples of cutting a corner having an acute angle and an obtuse angle to a specified detail. In each of these three examples, the angle of the corner is represented by $\alpha$ and the specified detail is represented by $\delta$. The specified detail $\delta$ may be based, for example, on detail requirements that are set forth in engineering blueprints or specifications. The programmed paths that trace the desired contours of the workpiece material are represented by P.

In the CNC machine according to the invention, the actual cutting path follows the programmed path P along a first side of the corner C until the specified detail $\delta$ is met. When the specified detail $\delta$ is met, the CNC machine is permitted to "cut" the corner C, as shown by the solid arrow A, and proceed onto the programmed path on the second side of the corner C.

In FIG. 4A, when the corner angle is equal to 90°, the specified detail δ is met when the actual cutting path is an allowable distance D=δ away from the corner C. However, in FIGS. 4B and 4C, when the corner angle is less than or greater than 90°, the specified detail δ is still met when the actual cutting path is an allowable distance D>δ away from the corner C. Thus, when the corner angle is less than or greater than 90°, the CNC machine can use an effective detail that is larger than the specified detail and still machine the corner to the specified detail. As a result, the CNC machine can cut the corner of the workpiece at an earlier time thus increasing the speed of this corner cut. In the conventional methods, by contrast, the cutting path must always reach point E, whose distance to the corner C is equal to the specified detail δ, before the CNC machine is permitted to cut the corner of the workpiece.

In the preferred embodiment, the allowable distance D, or the effective detail, is defined for every corner based on the equation: D=δ/sin α, where δ is the specified detail and a is the corner angle. Other definitions of the allowable distance D are within the scope of this invention, so long as its value is defined to be between the specified detail δ and the allowable distance D defined above.

Figure 5:
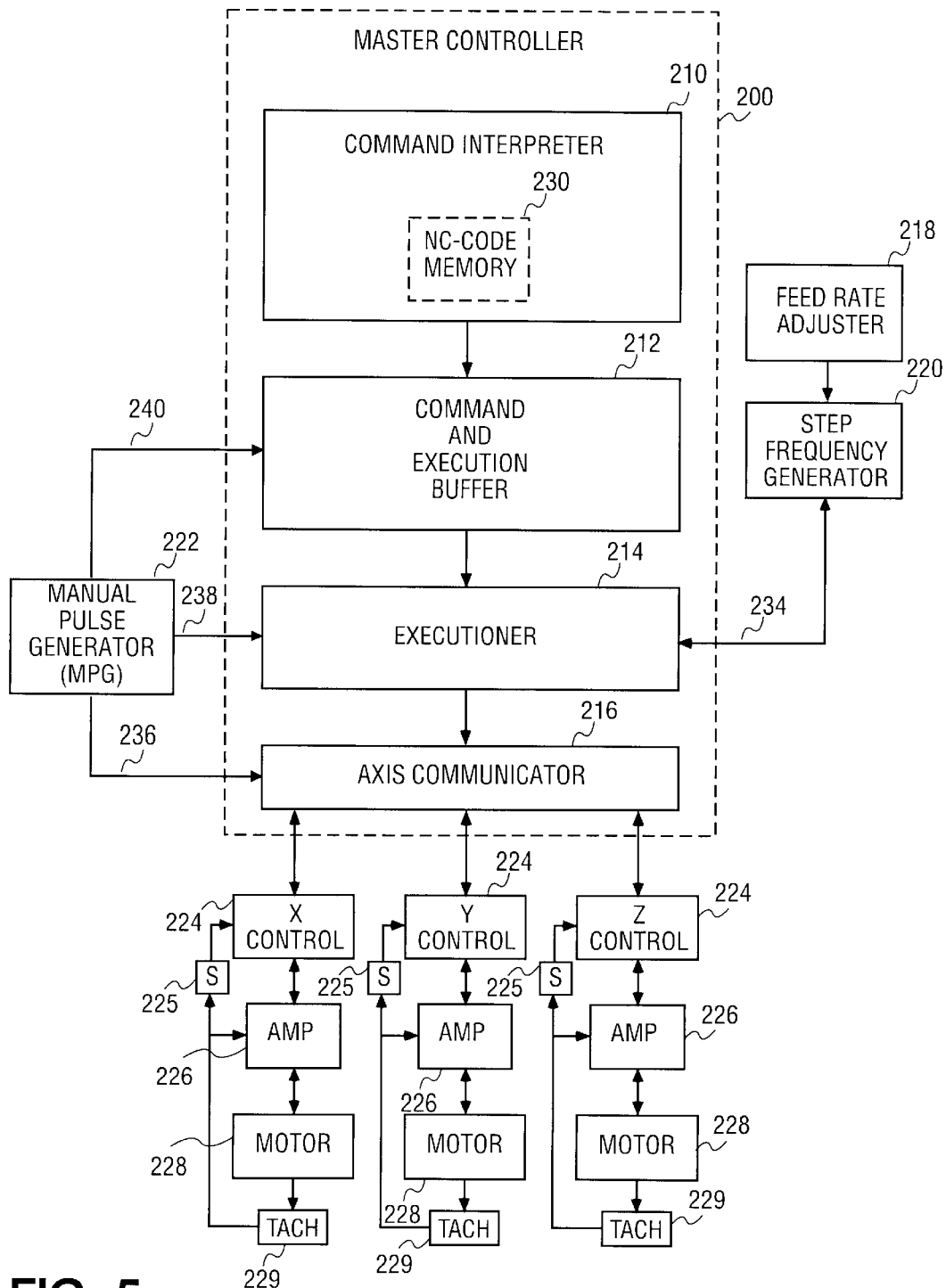
FIG. 5 is a general functional block diagram of the master controller and its associated control circuitry used in accordance with the present invention.

FIG. 5 shows a general functional block diagram of the CNC master controller 200, also referred to in this application as the PCU, and its associated control circuitry. Note that this is a functional block diagram, and not a schematic circuit diagram, since, for maximum flexibility, most of the front panel controls are wired to the microprocessor of the master controller 200, either directly or through an analog-to-digital converter (not shown). This is done in order to minimize the amount of circuitry that is required to be rewired or reconfigured to change options or add features in the CNC machine. In fact, the software program is the only thing that needs to be changed in many CNC machines in order to implement the features of the present invention. Also note that several microprocessors are used simultaneously during the actual operation to control the different axes and to interpret the NC-code, whereas only a master controller is functionally shown in FIG. 5. For further details regarding the electrical wiring of the components of the CNC machine, including the MPG handwheel encoder, refer to the aforementioned patents, or to the maintenance manual for the Fadal CNC 32 MP VMC machine, which is available from Fadal Engineering of Chatsworth, Calif.

In FIG. 5, the master controller microprocessor is shown having the following functional blocks: the command interpreter 210; the command and execution buffer 212; the executioner 214; and the axis communicator 216. The master controller 200 receives input signals from various circuits and controls such as the feed rate adjuster (potentiometer) 218, a step frequency generator 220, and the manual pulse generator 222. The master controller 200, via the executioner 214, provides a primary signal to an axis communicator 216, which, in turn, provides individual control signals to the individual X-, Y-, and Z-axis servo controllers 224. Each of these individual controllers 224 provides voltage control signals to the individual X-, Y-, and Z-axis amplifiers 226, which, in turn, control the X-, Y-, and Z-axis motors 228.

The NC part program is stored in an NC-code memory 230. The command interpreter 210 reads the NC-code program stored in memory 230 using an internal command line pointer. The command line pointer serves to point to the address of the block of NC-code that is to be read next. The operation of the command interpreter 210 will be explained in detail in the following flowcharts. However, in general, the command interpreter 210 interprets blocks of the NC-code stored in the memory 230 in sequence to compute motion command data, and stores the motion command data in the command and execution buffer 212. The command interpreter 210 preprocesses the NC-code until the command and execution buffer 212 is filled.

An example of a six-block NC-code part program is given below:

N1 Z1. G0
N2 Z-3. G1 F100.
N3 X1.
N4 Y1.
N5 X-1. Y-1.

Note that the NC-codes specify both position and feed rate. For example, NC-code block N2 above requires that the Z-axis machine slide be moved three inches in the negative Z direction at a feed rate of 100 IPM. However, the machine slides are actually advanced in "steps" according to a "step size" and a "step count" and "step frequency".

Since speed is related to both step size and step frequency, the speed of the move can change as the frequency changes. Although the step frequency generator 220 sends the initial frequency signal 234 to the executioner 214, this step frequency can be modified by adjustment of the feed rate adjuster 218 by the operator in various modes, or by the MPG as described below.

The command interpreter 210 serves to calculate a "step count" and "step size" from the position and rate information contained in the NC-code. For the NC-code block N2 example above, at a step frequency of 500 Hz, a feed rate of 100 IPM (or 1.67 IPS) would correspond to a step size of 0.003333 inch. At this step size, a step count of 900 would be required to travel the desired distance of 3 inches. Note, however, that this step size conversion example has been simplified to omit computation of any acceleration or deceleration ramps in the movement of the slide. In other words, the command interpreter 210 reads the NC-code block from the NC-code memory 230, and processes it into motion command data. To do so, it performs two procedures: (1) it computes the step size and step frequency according to the desired feed rate; and (2) it computes the step count from the step size and move length.

The step frequency generator 220 provides a fixed frequency pulse to the executioner 214 in the automatic mode. The step frequency multiplied by the step size determines the speed of the move, while the step count multiplied by the step size determines the distance of the move. In the automatic mode, the NC-code provides the basis to calculate the step count and step size from its position and rate information, while the step frequency remains fixed. However, as explained above, in the single step state, the feed rate adjuster 218 is used to scale the step frequency by an amount from 0% to 150% for rapid travel moves.

In most CNC machines, the manual pulse generator (MPG) 222 is only used to provide a pulse signal 236 to the axis communicator 216 for use in the jog mode. As is known in the art, the MPG 222 is an encoder which translates rotations of the MPG handwheel into pulses depending upon the rotation of the handwheel. The pulse signal is actually composed of two phased pulses used to determine the direction in which the handwheel is turned. This pulse signal 236 is provided to the axis communicator 216 in the jog mode to allow the operator to manually jog the slide in the positive or negative X, Y, or Z directions, as described above.

However, according to the present invention, the MPG also provides a frequency signal 238 to the executioner 214 and a direction signal 240 to the command and execution buffer 212 for use in the MPG dry-run mode. As will be explained in more detail in the flowcharts, the frequency signal 238 is used to determine the speed of operation in the MPG dry-run mode, i.e., the pulse rate from the MPG 222 is used by the executioner 214 as the desired frequency instead of using the frequency signal 234 from the step frequency generator 220. The direction signal 240 is used to determine the direction of operation in the MPG dry-run mode. For example, if the operator starts to turn the MPG handwheel counterclockwise, the executioner 214 begins reversing the direction of the move by either backing up through the order of the step counts or, if a previous block of NC-code is required, by decrementing the command line pointer to read the previous NC-code block.

With respect to moving backwards thorough the NC-code program, in the preferred embodiment described below, the operator can always move backward within a single NC-code block. In an alternative embodiment described below, the operator can also move backward to previous NC-code blocks, so long as those blocks have been interpreted and stored into the command and execution buffer, and so long as there were no program "jumps" or "calls" that would prevent the entire program from being executed backwards. These are not significant limitations in most NC-code programs. However, if desired, the first limitation can be overcome by increasing the size of the command and execution buffer 212, or by having the program go back and retrieve previous blocks of NC-code from the NC-code memory 230 and re-interpret and re-load them in reverse order into the command and execution buffer 212 as needed. The second limitation can be overcome by setting up another part of the command and execution buffer 212 to store a "reverse program thread" of any jumps or calls taken by the program in order to leave a complete trail that can be followed in reverse order between NC-code blocks. These two additions would permit the operator to run backwards through the entire NC-code program if desired.

In any case, the motion command data, consisting of the step size, step count, and step frequency, which is stored in the command and execution buffer 212, is then fed to the executioner 214. The step size is then provided to the axis communicator 216, which breaks up the step size into X-, Y-, and Z-axis components and supplies them to the respective X-axis, Y-axis, and Z-axis servo controllers 224.

An incremental move is executed when the executioner 214 sends a pulse to the servo controllers 224 by way of the axis communicator 216. For each such incremental move, the step count is decremented, and a move is completed when the step count reaches zero.

When the servo controllers 224 receive a pulse, they operate with the amplifiers 226 and the motors 228 to move the machine slides incrementally in the X, Y, and Z axes by their respective step size components. The servo controllers 224 generate a desired velocity signal in each of the X, Y, and Z axes based on the incremental move command, and the amplifiers 226, in turn, control the motors 228 to move the machine slides in accordance with these desired velocity signals.

Each desired velocity signal is, in effect, a position correction signal, because it is generated proportionally to reduce a following error, i.e., the difference between desired and current positions of the slides. The proportionality constant that governs the relationship between the desired velocity signal and the following error is the gain of the servo controller. In the preferred embodiment, the gains of the three servo controllers are equal and limited to be between 0.5 and 2.5, but they are not required to be equal and are not required to have these limits.

For each incremental move command, the desired position of the slides in each of the X, Y and Z axes is updated by an amount equal to their respective step size components. The current position of the slides in each of the X, Y, and Z axes is derived by feeding back a current velocity signal that is measured at the output of the motor by a tachometer 229 through an integrator 225.

The feedback velocity signal is also used by the amplifier to determine if the actual motor speed, represented by the feedback velocity signal, is equal the commanded motor speed, i.e., the desired velocity signal from the servo controller. When there is a difference between the actual and commanded motor speeds, the amplifier applies a velocity correction signal that is proportional to this difference to the motor.

The executioner 214 executes a move by sending a series of pulses to the servo controllers 224 through the axis communicator 216 at the step frequency. However, upon expiration of the last frequency cycle, the executioner will not automatically send a series of pulses associated with the next move. If the command interpreter 210 has previously determined that the next move forms a corner with the current move, i.e., the angle between the two moves is between 0° and 180°, the command interpreter 210 will have stored a detail check request in the command buffer between the current move block and the next move block. When the executioner recognizes the detail check request, it will conduct a detail check by polling the servo controllers 224 to determine whether a detail has been satisfied. If the following error is greater than the detail for any of the X, Y, and Z axes, the servo controllers will continue to generate position correction signals until the following error is reduced to be less than or equal to the detail in each of the X, Y, and Z axes.

Consequently, the series of incremental move commands associated with the next move is suspended for a fixed period of time. In the preferred embodiment, a time period of 25 ms is set such that if a detail is not satisfied within 25 ms, the executioner will proceed onto the next move. This feature is implemented in part to prevent the CNC machine from slowing down excessively as a result of gain or detail that has been specified to be too small.

Detail is not a fixed value, but varies with the angle of the corner. The command interpreter 210 defines the detail D to be equal to the specified detail $D_0$ divided by the sine of the corner angle. The X, Y, and Z axes components of the detail D are as follows (Eqn. 1):

$$D_x = D * x1 / \text{sqrt}(x1^2 + y1^2)$$

$$D_y = D * y1 / \text{sqrt}(x1^2 + y1^2 + z1^2)$$

$$D_z = D * z1 / \text{sqrt}(x1^2 + y1^2 + z1^2)$$

where x1, y1, and z1 are respectively X, Y, and Z axes components of the current move vector.

Further, the CNC machine according to the invention achieves machining or cutting of the workpiece by moving its tool relative to the workpiece material. The relative movement of the tool with respect to the workpiece material can be achieved by moving either the tool or the platform that is holding the workpiece material. In the preferred embodiment, the tool is moved in the Z axis, and the platform is moved in two axes, the X and Y axes.

The movement of either the tool or the platform is carried out through a connection with a respective drive assembly that includes the servo controller 224, the amplifier 226, and the motor 228. A rotation of the motor 228 at its respective spin rate causes movement in the X, Y, and Z axes and determines the path of the tool relative to the platform.

The construction and other operations of the axis communicator 216, the servo controllers 224, the amplifiers 226, and the motors 228 are otherwise known to those skilled in the art, and no further explanation will be provided herein. For more details regarding their operation, refer to the aforementioned operation and maintenance manuals.

Figure 6:
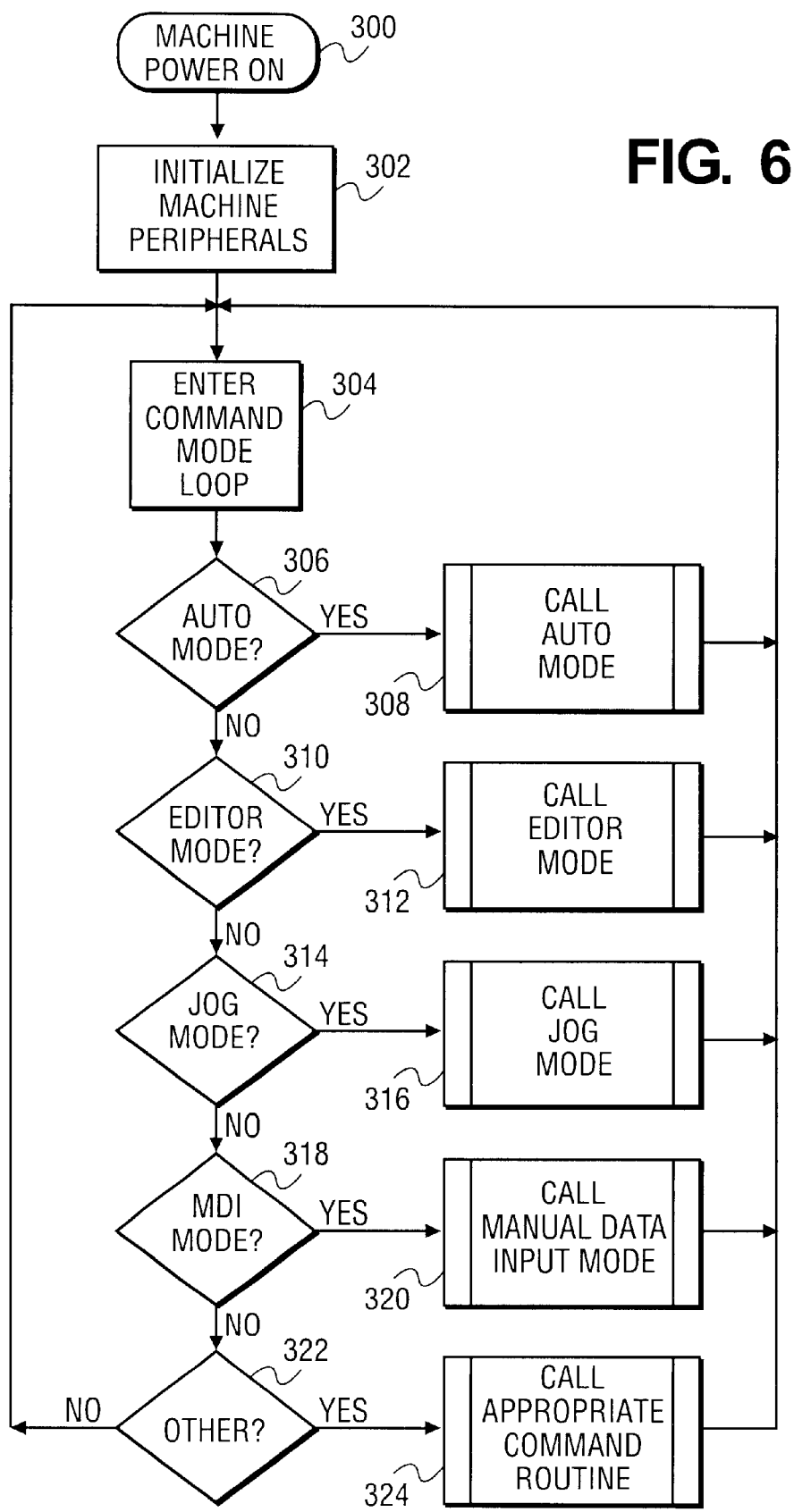
FIG. 6 represents a flowchart illustrating the overview of operations performed by the master controller of FIG. 5 in accordance with the practice of the present invention.

Referring now to FIG. 6 the flowchart illustrates the operation of the master controller of the CNC machine in accordance with the present invention when the machine is first powered on and enters the command mode. As will be seen below, the command mode is essentially a control loop which allows the operator to input commands from the keyboard as well as activate the various different modes described above.

As soon as the CNC machine is powered on at Step 300, the machine initializes its peripherals in Step 302. These peripherals would include such things as the axis communicator 216, X, Y, and Z controllers 224, amplifiers 226, etc. Then the program enters the command mode loop at step 304, periodically checking the control panel and keyboard for an input signal. If the operator presses the AUTO function key or types "AU" on the keyboard, the decision is made at Step 306 to call and transfer control to the auto mode at 308. The auto mode is described in detail in the flowchart of FIG. 7. If the operator types "PA" (for "PAge editor") as a keyboard command, the decision is made at Step 310 to transfer control to the editor mode at 312. This editor mode is primarily used to allow the operator to edit the NC-code program manually using the keyboard. The operation of this mode is well known, and is not further described herein.

If the operator presses the JOG function key, or types in "JO-X" (for "JOg" in the "X"-axis), "JO-Y" (for "JOg" in the "Y"-axis), or "JO-Z" (for "JOg" in the "Z"-axis) on the keyboard, the decision is made at Step 314 to enter the jog mode at 316. As described above, the jog mode is used to manually jog the machine along the X, Y, and Z axes as described above. Again, this mode of operation is well known, and is not described further herein.

If the operator presses the MANUAL function key, the decision is made at Step 318 to enter the manual data input (MDI) mode of operation at 320. As explained above, the MDI mode is used by the operator to manually control the machine by typing individual NC-code blocks via the keyboard. For example, if the operator typed "X1. G1 F100.", the machine would move 1 inch in the positive X-axis direction at 100 IPM.

In Step 322, the decision is made whether or not another valid command has been entered by the operator. If so, control is transferred to the appropriate command routine at Step 324. If not, control is transferred back to Step 304 to reenter the command mode loop. An example of such an appropriate command routine would be when the operator would type "DT" in order to enter the Display Tools routine. Again, the DT routine and other valid command routines are well known, and will not be further described herein. Refer to the aforementioned user manual for more information.

Figure 7:
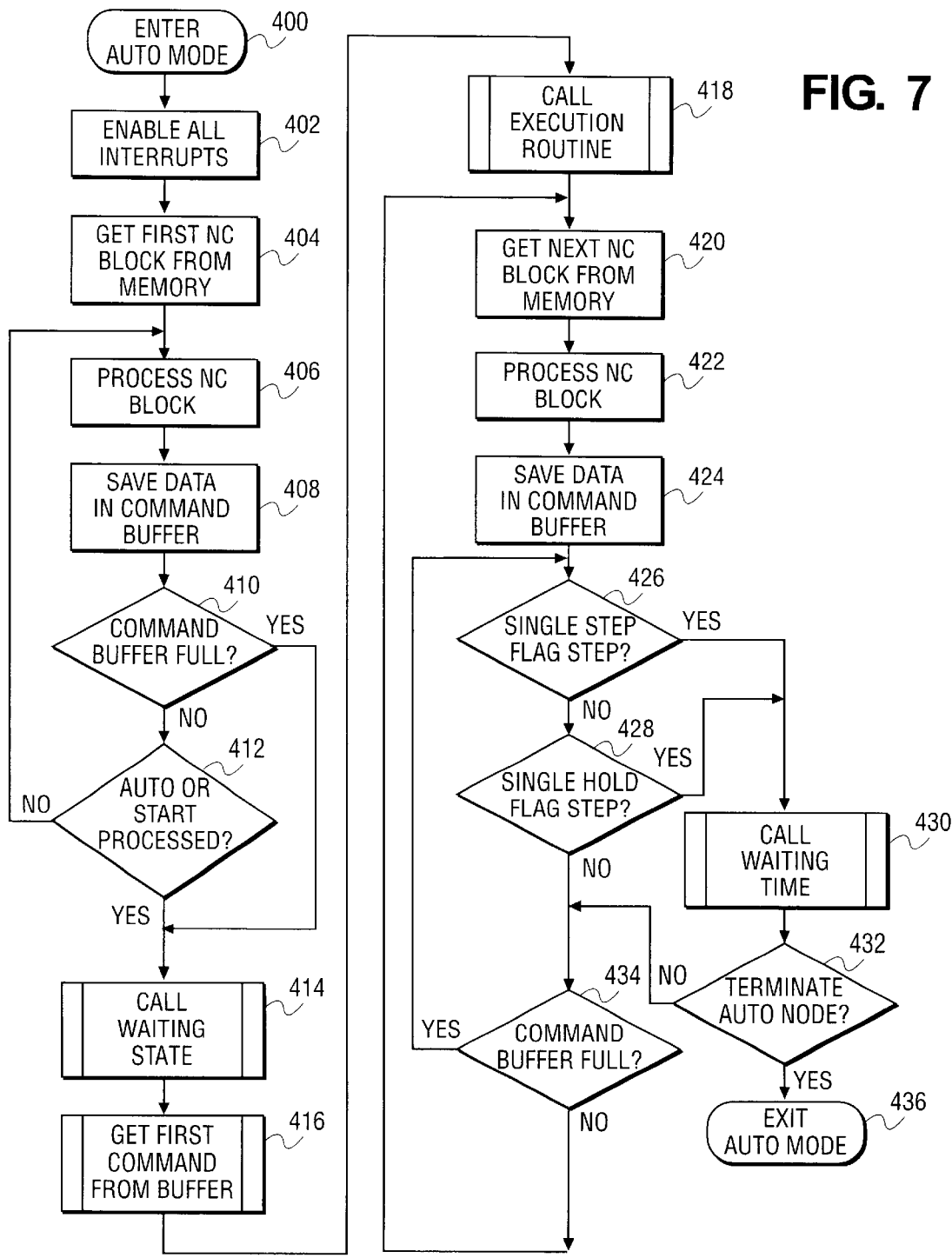
FIG. 7 is a flowchart showing the specific sequence of steps performed by the master controller in the automatic mode of operation.

FIG. 7 illustrates the operation of the steps performed by the master controller in the automatic mode. Generally, the auto mode runs in the background during CNC machine operation to perform the function of the command interpreter 210 which reads the NC-code from the NC-code memory 230, calculates the motion command data, and stores the command data into the command and execution buffer 212. Then the execution routine is called to execute the code as will be seen below.

When the automatic mode is called from Step 308 of FIG. 6, control is transferred at Step 400 to enter into the auto mode. In Step 402, all interrupts, including keyboard interrupts and one-third second (0.3 sec) interrupts are enabled. The first block of NC-code is then read from the NC-code memory in Step 404, and processed by the command interpreter in Step 406. As explained above, the processing of the NC block of code includes the steps of parsing the G-code into machine movement step information, including the step size, step count, and step frequency stored as motion command data. The parsing is performed in accordance with the ramp time specified by the program such that moves requiring acceleration and deceleration take as long as the specified ramp time to ramp up or down in velocity.

In Step 408, the motion command data is saved in the command and execution buffer, and its status is checked in Step 410 to see if the buffer is full. If the command buffer is not full, the decision is made at Step 412 whether or not the operator has pressed the AUTO key or START button. If not, control returns to Step 406 to continue reading, interpreting, and filling the command buffer. If the AUTO key or START button was pressed at Step 412, or if the command buffer was full at Step 410, then control proceeds to call the waiting state at Step 414.

As will be explained below in accordance with FIG. 9, the waiting state monitors whether the MPG handwheel is being used in the MPG dry-run mode. It also checks a second time to see whether or not the AUTO key was pressed. This is done for reasons of safety, so the CNC machine does not enter the auto mode of operation immediately once the AUTO key is pressed a first time, but instead requires the operator to press it a second time after some amount of NC-code has been processed and loaded into the command buffer.

Upon returning from the waiting state, the first motion command is read from the command buffer in Step 416, and the execution routine is called in Step 418. As will be explained below in conjunction with FIG. 8, the execution of the motion command is first implemented by initializing the step settings for the next programmable interrupt to execute the move.

The execution routine called at Step 418 then returns, and the next block of NC-code is read from the NC-code memory 230 in Step 420. The NC block is processed in Step 422 and saved in Step 424 in the same manner as explained in Steps 406 and 408. Next, in Steps 426 and 428, the program checks to see if either the single step flag of the slide hold flag was set. If either of these are true, indicating an operator request, then control proceeds to Step 430 to again call the waiting state routine.

Upon returning from the waiting state, the decision is made in Step 432 whether or not to terminate the auto mode. This decision is performed by checking the termination flag which would have been set when the operator pressed the MANUAL key in the waiting state. If the auto mode should not be terminated, control proceeds to Step 434, where the command buffer is checked to see if it is full. If it is not full, control returns to Step 420 to continue processing the next block of NC-code. If the command buffer is full in Step 434, control proceeds to Step 426 to again check whether or not the single step state is requested. This loop serves to make the auto mode wait until the programmable clock interrupt executes some motion command data and frees up some space in the command buffer. However, if the operator has intervened, the waiting state is again called in Step 430, and the decision whether to terminate the auto mode is again made in Step 432. The auto mode may be exited in Step 436.

Figure 8A:
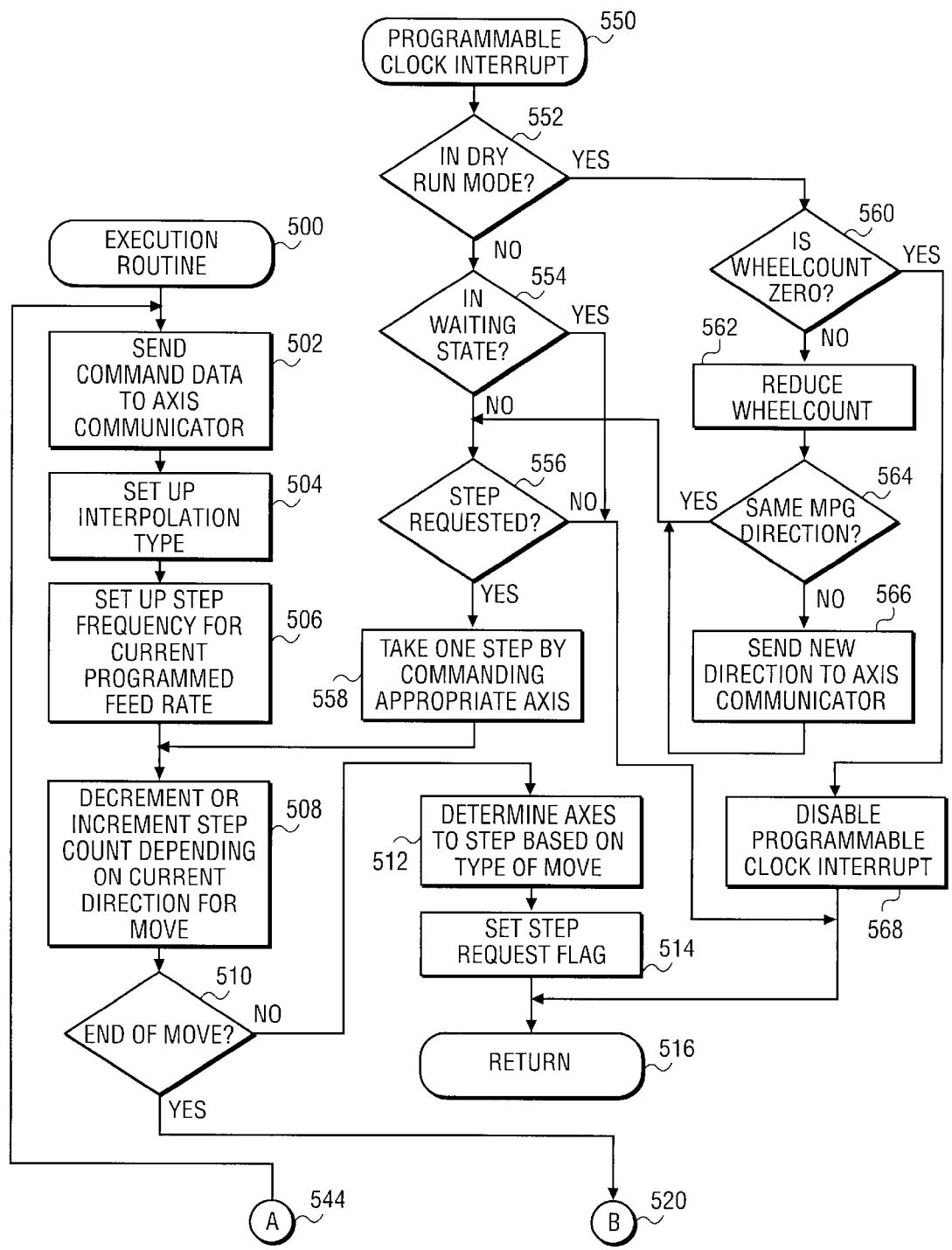
FIGS. 8A and 8B represent a flowchart showing the specific sequence of operations performed during the execution routine and during a programmable clock interrupt.
Figure 8B:
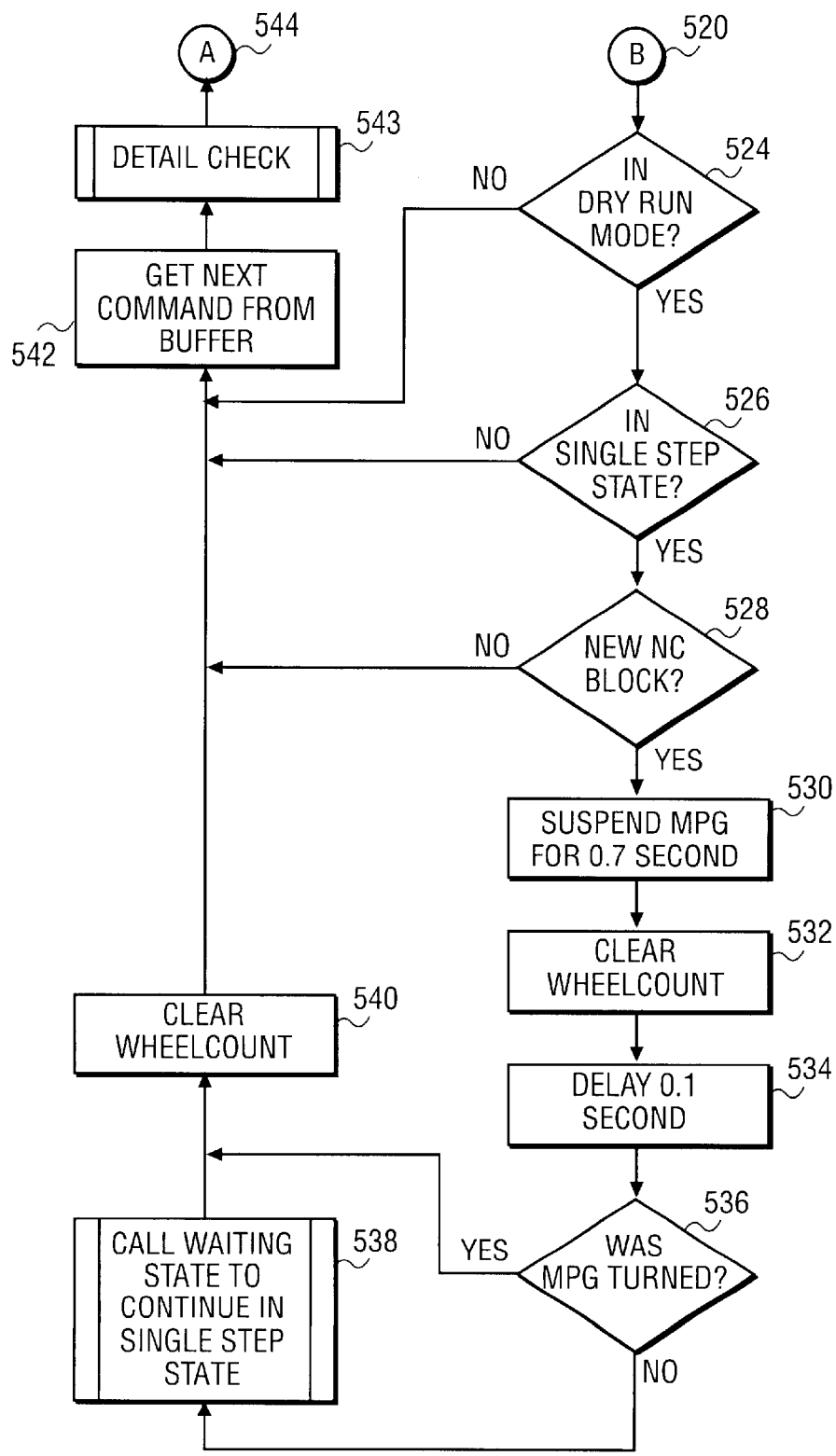

FIGS. 8A and 8B represent the sequence of steps performed by the master controller during the execution routine, as well as the programmable clock interrupt routine. The execution routine 500 is called from the auto mode, as explained above with respect to Step 418 of FIG. 7 and restarted when motions commands are taken from the command buffer. On the other hand, the programmable clock interrupt 550 is a hardware interrupt called caused by the step frequency generator, as explained below with respect to Step 634 of FIG. 9.

Upon the occurrence of an execution routine at Step 500, the step size and step count of the motion command data are sent to the axis communicator 216 in Step 502. The axis communicator 216 then supplies to each of the X, Y and Z servo controllers 224 a move command indicating a desired position in each of the X, Y and Z axes.

As previously explained, a new move command supplied to the servo controllers 224 may not be immediately used, because the servo controllers 224 may not have sufficiently reduced the following error associated with a current move command to less than or equal to the specified detail. Regardless of what action the servo controllers 224 take, the flow of execution proceeds to Step 504 which sets up the type of interpolation, depending upon the type of move required. For example, a linear interpolation would be used for a "G1" move, whereas a point-to-point interpolation would be used for a "G0" move. Circular or helical interpolations may also be used.

The clock in the step frequency generator 220 is then set up in Step 506 for the current programmed feed rate, using the step frequency information of the motion command data. For example, if the step frequency needed to obtain the appropriate feed rate is 500 Hz, then the step frequency generator is set to provide such a 2 millisecond pulse signal. In Step 508, the step count is decremented or incremented, depending upon the current direction for the move. As explained above, this direction is always forward in the auto mode or the single step state, unless the MPG handwheel has been turned in a counterclockwise direction in the MPG dry-run mode. In that case, the step count would be decremented.

Step 510 checks whether or not the program has reached the end of the move. This decision is made by determining whether the current step count has reached the final step count stored as motion command data. If the move has not ended, then Step 512 serves as an interpolation routine to determine the axes what will be stepped during the move. In the more trivial case of a "G1" linear move, each axis is commanded according to the motion command data. However, in the case of a circular or helical move, the interpolation routine calculates which axes to step to achieve the programmed shape. This type of interpolation is known in the art.

Next, in Step 514, the step request flag is set such that a step will be taken during the next programmable clock interrupt. Afterwards, control returns to the auto mode of FIG. 7 where the program continues interpreting the NC-code as needed until the next programmable interrupt occurs.

If the end of the move is reached at Step 510, control proceeds through node 520 to decision Step 524 of FIG. 8B to determine whether or not the control is in the MPG dry-run mode of operation. This is determined by checking the MPG dry-run mode flag which might have been set during a previous waiting state. If the machine is running in the MPG dry-run mode, then the single step flag is checked in Step 526 to see if the MPG dry-run mode was activated from the single step state, and, if so, a decision is made in Step 528 whether the next move is the start of a new block of NC-code. This is done to pause the machine for a short while to let the operator know that an end of a move has been reached, i.e., that the block of NC-code that was being single-stepped through using the MPG handwheel has been completed. Accordingly, in Step 530, the operation of the MPG dry-run mode is suspended for 0.7 seconds in order to provide sufficient time to let the operator take his hand off of the MPG handwheel. In Step 532, the MPG handwheel wheelcount counter is cleared, which are used to keep track of the number of MPG handwheel clicks and the direction. In Step 534, a delay of 0.1 seconds is taken in order to provide a measurement interval to determine whether or not the MPG handwheel was turned during this 0.1 second delay. If the handwheel was not turned, then the waiting state is called in Step 538 to let the operator continue in the single step state. However, if the MPG handwheel was turned at Step 536, control proceeds directly to Step 540 where the MPG handwheel wheelcount are again cleared, and the next motion command is read from the command buffer in Step 542. Step 543 calls a Detail CHECK routine which is explained below in further detail with reference to FIG. 14. Control then returns through node 544 to the beginning of the execution routine at Step 502 to execute the next motion command.

Again referring to FIG. 8A, if a programmable clock interrupt occurred at Step 550, the decision is made at Step 552 whether or not the controller is operating in the MPG dry-run mode. If the machine is not operating in the MPG dry-run mode in Step 552, the controller checks to see whether or not it is presently in the waiting state in Step 554. If so, control proceeds to Step 516, to return from the interrupt. If not in the waiting state, Step 556 checks the step request flag to see if a step has been requested. If no such step was requested, control proceeds to Step 516 to return from the interrupt. If a step was requested, control proceeds to Step 558, wherein the axis communicator 216 is instructed to take one step by commanding its appropriate X, Y, or Z axis controller 224. Control then proceeds to Step 508 as before.

If, in Step 552, the controller is in the MPG dry-run mode, then the MPG handwheel wheelcount is checked in Step 560 to see if any MPG pulses are remaining in the count, i.e., whether the wheelcount is zero. If there are pulses remaining, the wheelcount is reduced toward zero in Step 562 and the direction of the MPG handwheel is checked in Step 564 to see whether or not the commanded direction of the move matches the direction that the MPG handwheel is turning. If the directions do not match, then the new direction is sent to the axis communicator 216 in Step 556. If the directions do match in Step 564, or once the new direction is sent in Step 566, control again proceeds to Step 556 check the step request flag to see if a step was requested as before.

In Step 560, if the wheelcount was zero such that no MPG pulses remain to be processed, then the programmable clock interrupt is disabled in Step 568. This serves to stop the machine when the MPG handwheel stops. Control then proceeds to Step 516 to return from the interrupt.

Figure 9:
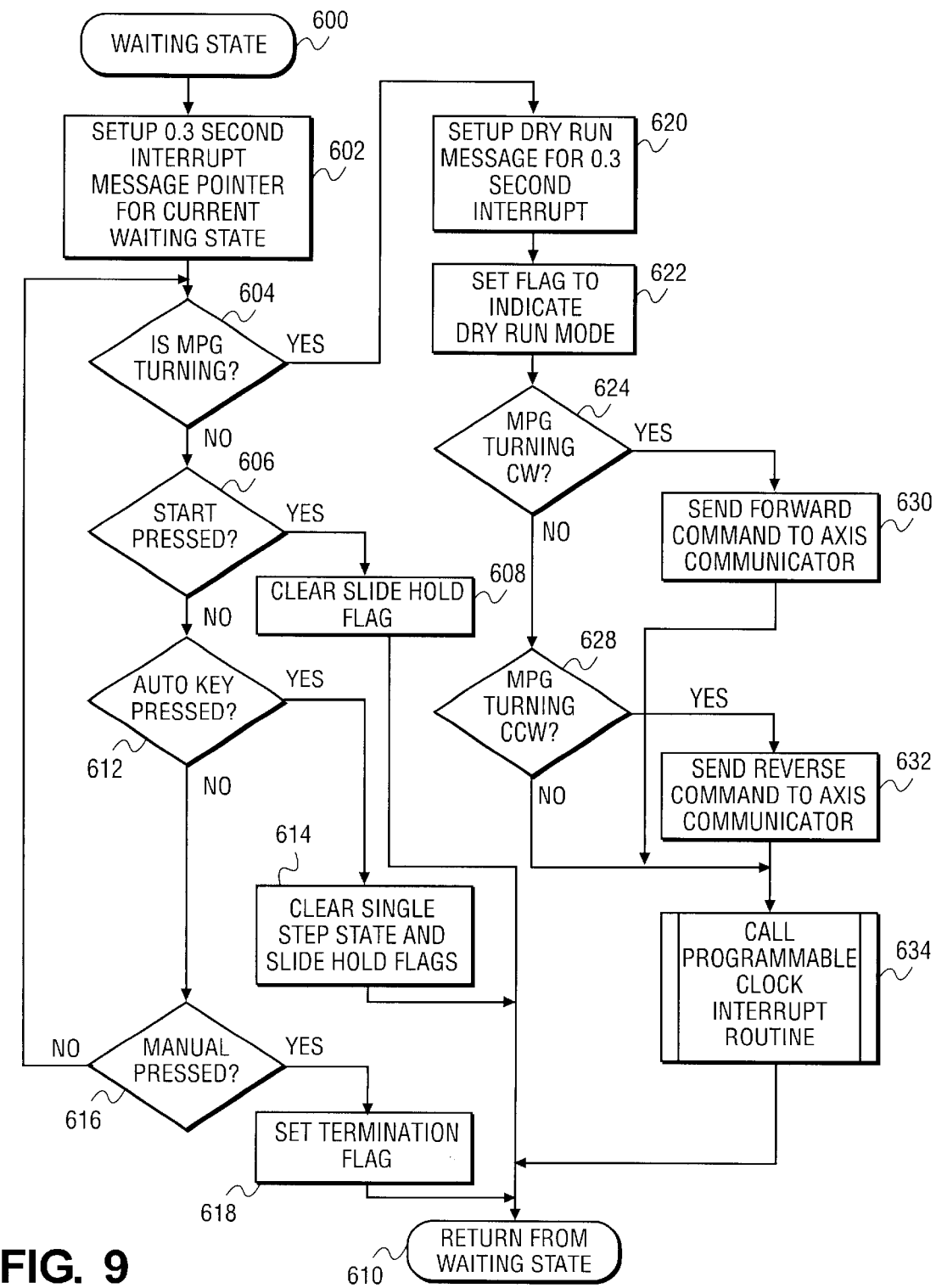
FIG. 9 is a flowchart illustrating the sequence of steps performed during the waiting state.

Referring now to FIG. 9, the flowchart illustrates the steps occurring during the waiting state of the master controller.

FIG. 9 illustrates that the controller first enters the waiting state in order to get to the MPG dry-run mode of operation, and to call the programmable clock interrupt routine of FIG. 8A. As explained above, the waiting state was called from Step 430 in FIG. 7.

Upon entry into the waiting state at Step 600, the one-third second interrupt message pointer is set up for the current wait state. This free-running one-third second interrupt is described below with respect to FIGS. 10A and 10B, and is used in controlling various machine operations. In Step 604, the pulses from the MPG encoder are monitored to determine whether or not the MPG handwheel is being turned by the operator. If not, the START button flag is checked to determine whether or not to clear the slide hold flag in Step 608. Step 610 then returns control from the waiting state. Similarly, in Step 612, the AUTO key flag is checked to determine whether of not to clear the single step state flag and the slide hold flag in Step 614. If the MANUAL key flag was set, Step 616 directs Step 618 to set the termination flag. If not, control returns to Step 604 to wait for some action to be taken by the operator.

If the MPG handwheel is being turned by the operator in Step 604, control proceeds to Step 620 in order to set up the MPG dry-run message to be displayed during the one-third second interrupt routine. As will be seen below, in the preferred embodiment, the video display blinks a corresponding message on the screen. Next, in Step 622, the flag is set to indicate that the master controller is operating in the MPG dry-run mode.

In Steps 624 and 628, the MPG handwheel pulses are monitored to determine the direction that the MPG handwheel is being turned. If clockwise, the forward direction command is sent to the axis communicator in Step 630. If counterclockwise, the reverse direction command is sent to the axis communicator in Step 632. The control program (not shown) for the axis controllers 224 must accept both the forward and reverse direction commands. In both cases, control returns to Step 634 in order to call the programmable clock interrupt routine described in FIGS. 8A and 8B in order to take the one step by commanding the appropriate axis. Control then returns from the waiting state in Step 610.

Figure 10A:
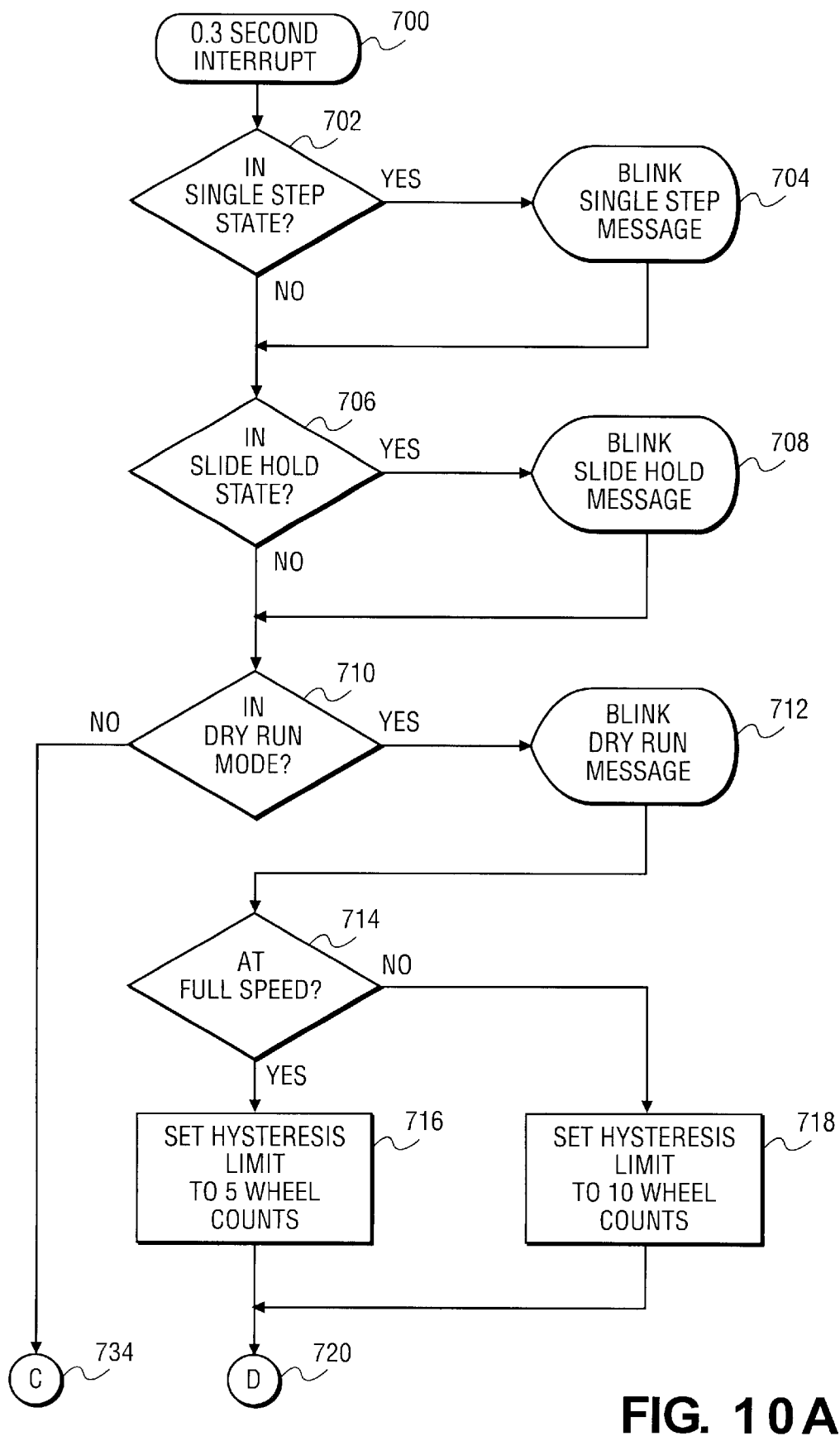
FIGS. 10A and 10B represent a flowchart showing the operation of the one-third second free running interrupt.
Figure 10B:
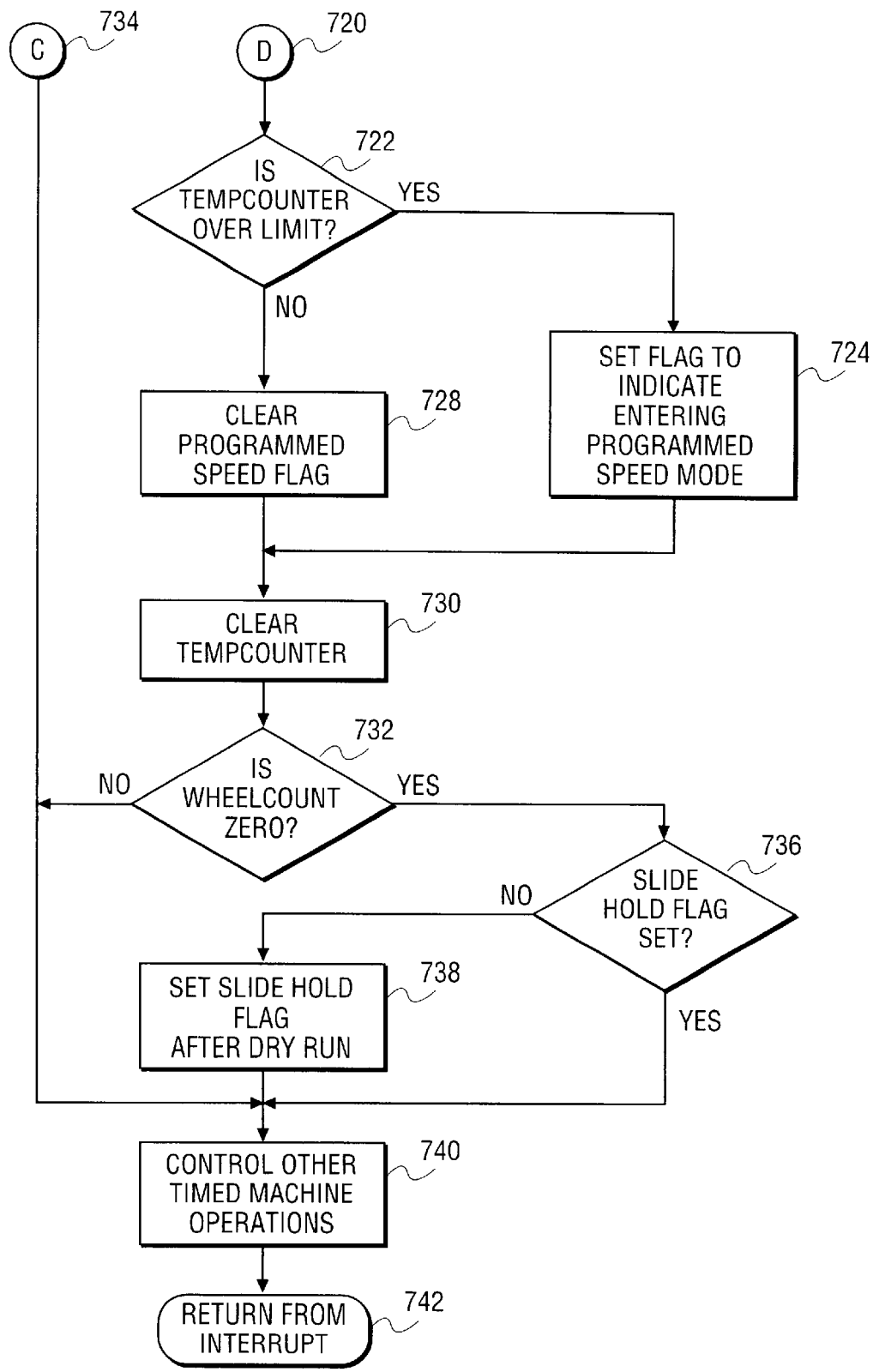

FIGS. 10A and 10B describe the operation of the one-third second interrupt routine. This is a free-running interrupt that is always occurring during operation of the CNC machine in order to control such machine operations as the blinking of the current state message on the display, the cursor blinking, the oiler control, etc. Upon occurrence of the interrupt at Step 700, the controller checks the single step flag to see whether it is in the single step state in Step 702. If so, the single step message "SINGLE STEP" is blinked on the video display in Step 704. Similarly, in Step 706, the slide hold state is checked and if active, the message "SLIDE HOLD" is blinked on the display at Step 708.

In Step 710, the controller looks to see if it is operating in the MPG dry-run mode by checking its flag. If it is, the MPG dry-run message "MPG DRY RUN" is flashed on the display at 712. If not, control proceeds through node 734 to Step 740 of FIG. 10B, described below. Once the controller is operating in the MPG dry-run mode, Step 714 checks a programmed speed flag to see whether or not the MPG dry-run is set to operate in either the full programmed speed or one-half programmed speed. If so, a hysteresis limit is set to five wheelcounts in Step 716. This hysteresis limits sets a threshold which must be exceeded during the 0.3 second interrupt by the operator turning the MPG handwheel to achieve the full or one-half programmed speed rates referred to above. If not operating at the full or one-half programmed speed rate, the hysteresis limit is set to ten wheelcounts in Step 718 in order to establish a hysteresis loop before achieving this rate the next time.

Control then proceeds through node 720 to Step 722 of FIG. 10B, where the tempcounter variable is checked, i.e., the controller asks whether the number of handwheel turns per one-third second interval is larger than the hysteresis limit set in the previous steps. If the number of turns is larger than the hysteresis limit, then a flag is set in Step 724 to indicate full speed operation. If the hysteresis limit has not been exceeded, then Step 728 clears the programmed speed flag. Control then proceeds to Step 730, where the tempcounter variable is cleared in order to get a new count during the next 0.3 second interrupt.

In Step 732, the MPG handwheel wheelcount is checked to see if it is zero. If it is zero, the slide hold waiting flag is checked in Step 736 to see if it is set. This would occur when the operator has stopped turning the MPG handwheel and the wheelcount has been depleted. If the slide hold waiting flag has not previously been set, it is set in Step 738. Then, in Step 740, other timed machine operations are controlled or performed, such as machine oilers, brakes, etc. Finally, in Step 742, the program returns control from the interrupt to its previous state.

Figure 11A:
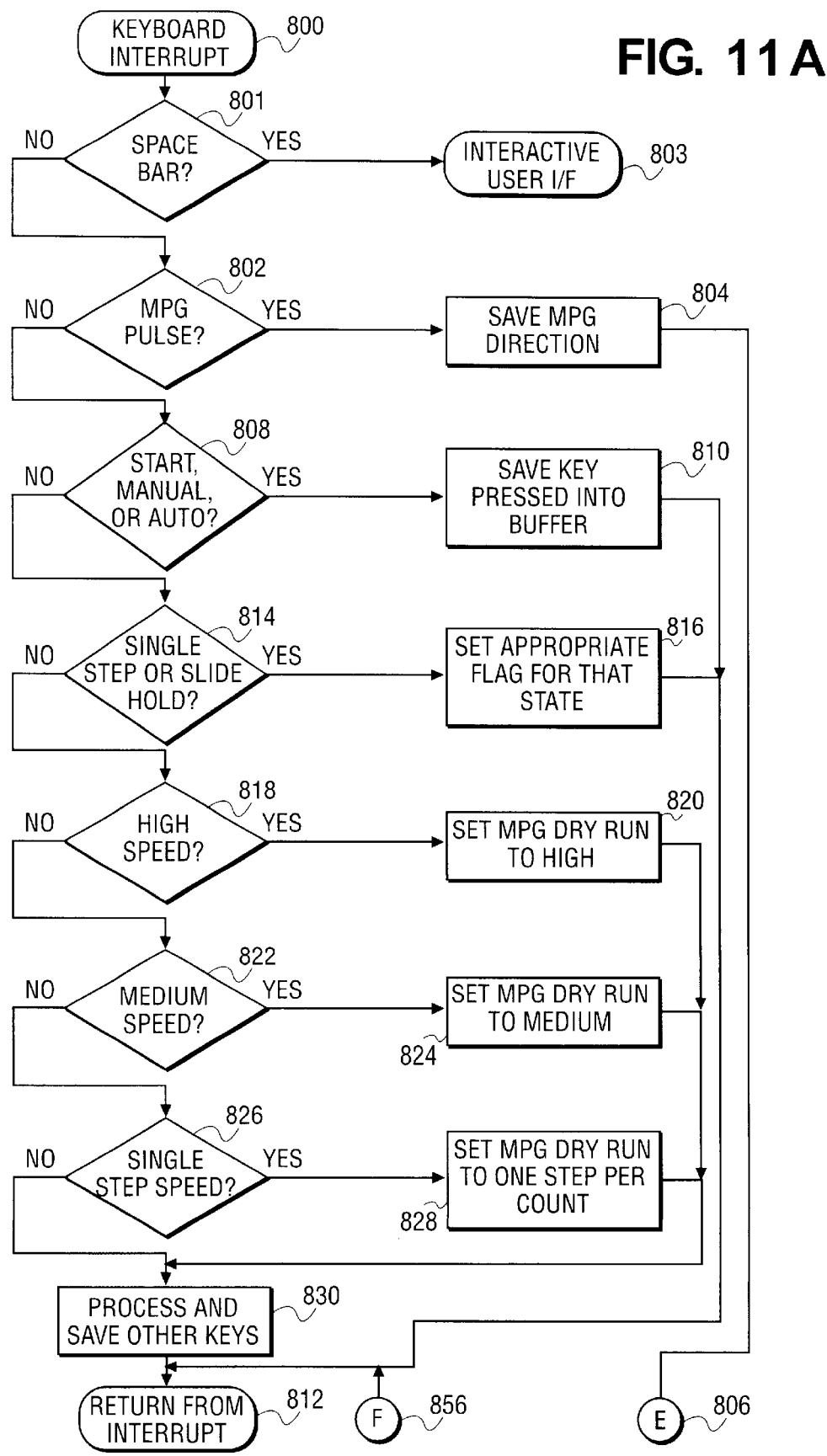
FIGS. 11A and 11B represent a flowchart showing the specific sequence of operations during a keyboard interrupt.
Figure 11B:
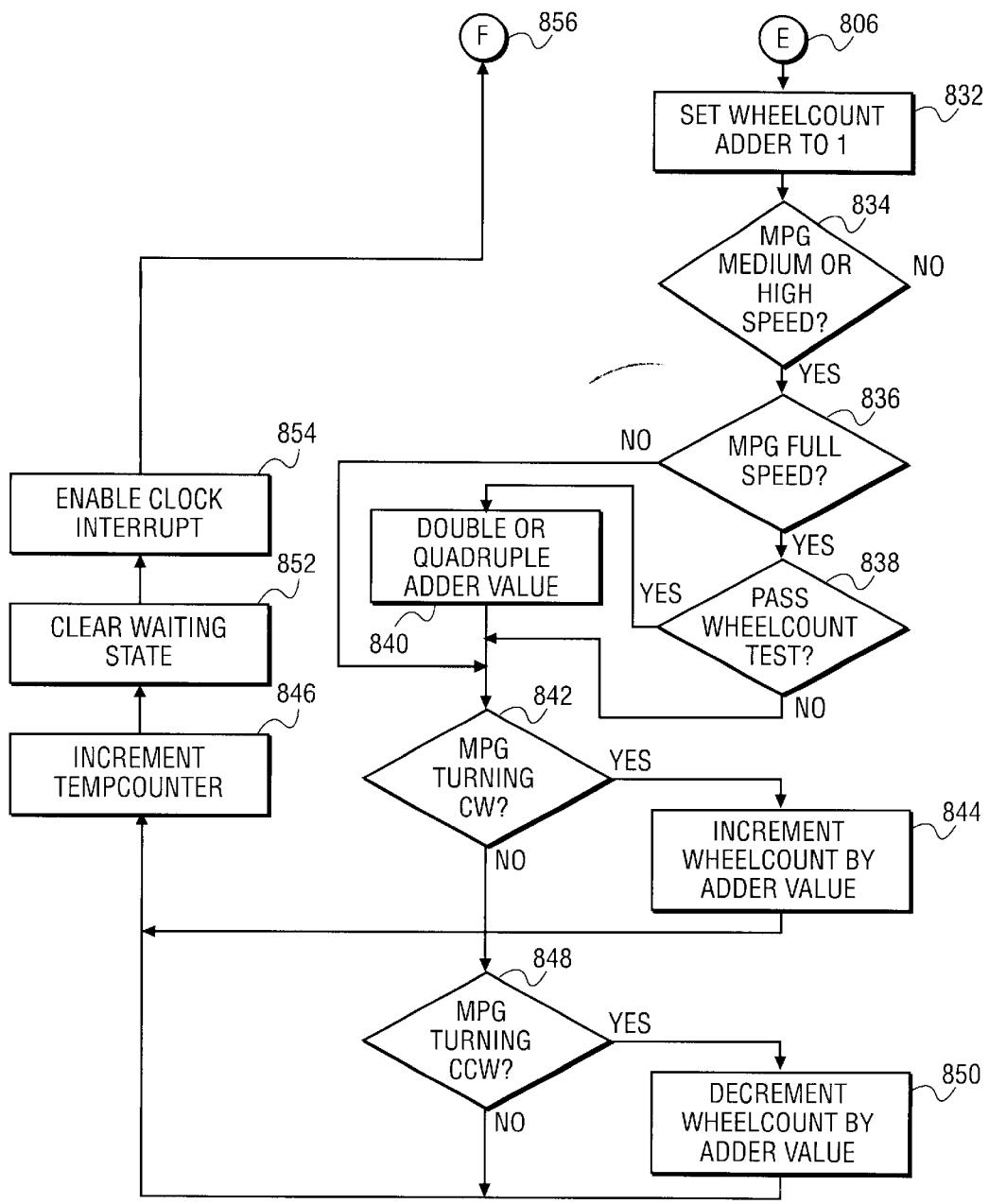

FIGS. 11A and 11B describe the keyboard interrupt routine which occurs whenever the operator presses a key on the keyboard or a CNC function key, sets a control panel switch, or turns the MPG handwheel. The keyboard interrupt routine reads the key pressed and processes it as described below.

Upon occurrence of the keyboard interrupt at 800, the keyboard peripheral is checked at Step 801 to see if the space bar has been pressed. If so, the INTERACTIVE USER I/F routine 803 is entered and flow proceeds as described later with reference to FIG. 12.

If the space bar has not been pressed, the keyboard peripheral is checked at Step 802 to see if MPG pulses are present. The keyboard controller program (not shown) used to interface the MPG 222 to the master controller 200 must send the MPG pulses in all modes. If MPG pulses are present, the direction that the MPG handwheel is being turned is saved in Step 804. Control then proceeds to node 806 to utilize the saved MPG parameters as will be described below in FIG. 11B.

If the handwheel was not turned, then the program checks to see if either the START button, the MANUAL key, or the AUTO key was pressed in Step 808. If so, Step 810 saves the key status into the keyboard buffer, and proceeds to Step 812 to return from the keyboard interrupt. Similarly, in Step 814, the controller checks to see if the SINGLE STEP key or the SLIDE HOLD button was pressed. If so, the appropriate flag is set, and returns from the keyboard interrupt.

In Steps 818, 820, 822, and 824, the program monitors the increment selector switch 138 status to determine the speed selection for the MPG dry-run mode. If the selector switch is in the H=High Speed (the 0.01) position at Step 818, the High Speed programmed rate flag is set in Step 820. If the selector switch is in the M=Medium Speed (the 0.001) position at Step 822, the Medium Speed programmed rate flag is set in Step 824. Finally, if the selector switch is in the L=Low Speed (the 0.0001) position at Step 826, the low speed programmed rate flag is set in Step 828 to that the MPG dry-run operation is set to run at the speed proportional to the turning of the MPG handwheel. i.e., at one step per count. Any other keys that are pressed are processed in Step 830, and their status is saved into the keyboard buffer before returning from the interrupt at Step 812.

If, however, it was determined in Step 802 that the turning of the MPG handwheel caused the keyboard interrupt, then after saving the MPG handwheel direction in Step 804, control proceeds through node 806 to Step 832 in FIG. 11B. There, a wheelcount adder is initially set to one in Step 832, and the MPG speed flags are checked in Step 834 to determine whether or not the High or Medium Speed MPG dry-run has been selected, as opposed to the proportional speed operation. If the High or Medium Speed was selected, control proceeds to Step 836 where controller checks to see if full speed MPG dry-run operation has yet been achieved. If so, the wheelcount is tested in Step 838 to determine whether the current wheelcount is larger than one if Medium Speed was selected, or larger than two if High Speed was selected. This step serves to prevent the wheelcount from getting too large since, at the High and Medium Speed rates, only the handwheel motion is taken into account, not the number of pulses. If the current handwheel passes this test in Step 838, then the adder is doubled if Medium Speed was selected, or quadrupled if High Speed was selected in Step 840. This doubling or quadrupling is necessary to keep the machine running in the programmed speed rate mode at the High and Medium Speed settings.

Negative results from the previous three decision steps return control to Step 842, where the MPG handwheel direction is checked. If it is being turned in a clockwise direction, the wheelcount is incremented by the adder amount in Step 844, or if it is being turned in a counter-clockwise direction in Step 848, the wheelcount is decremented by the adder amount in Step 850.

In Step 846, the tempcounter is incremented by one to keep track of the number of clicks per 0.3 second interrupt interval. As mentioned above, the tempcounter variable is used with the hysteresis threshold. Then Step 852 clears the waiting state flag. Finally, the programmable clock interrupt is enabled in Step 854 before control is returned from the interrupt in Step 812 through node 856.

Figure 12:
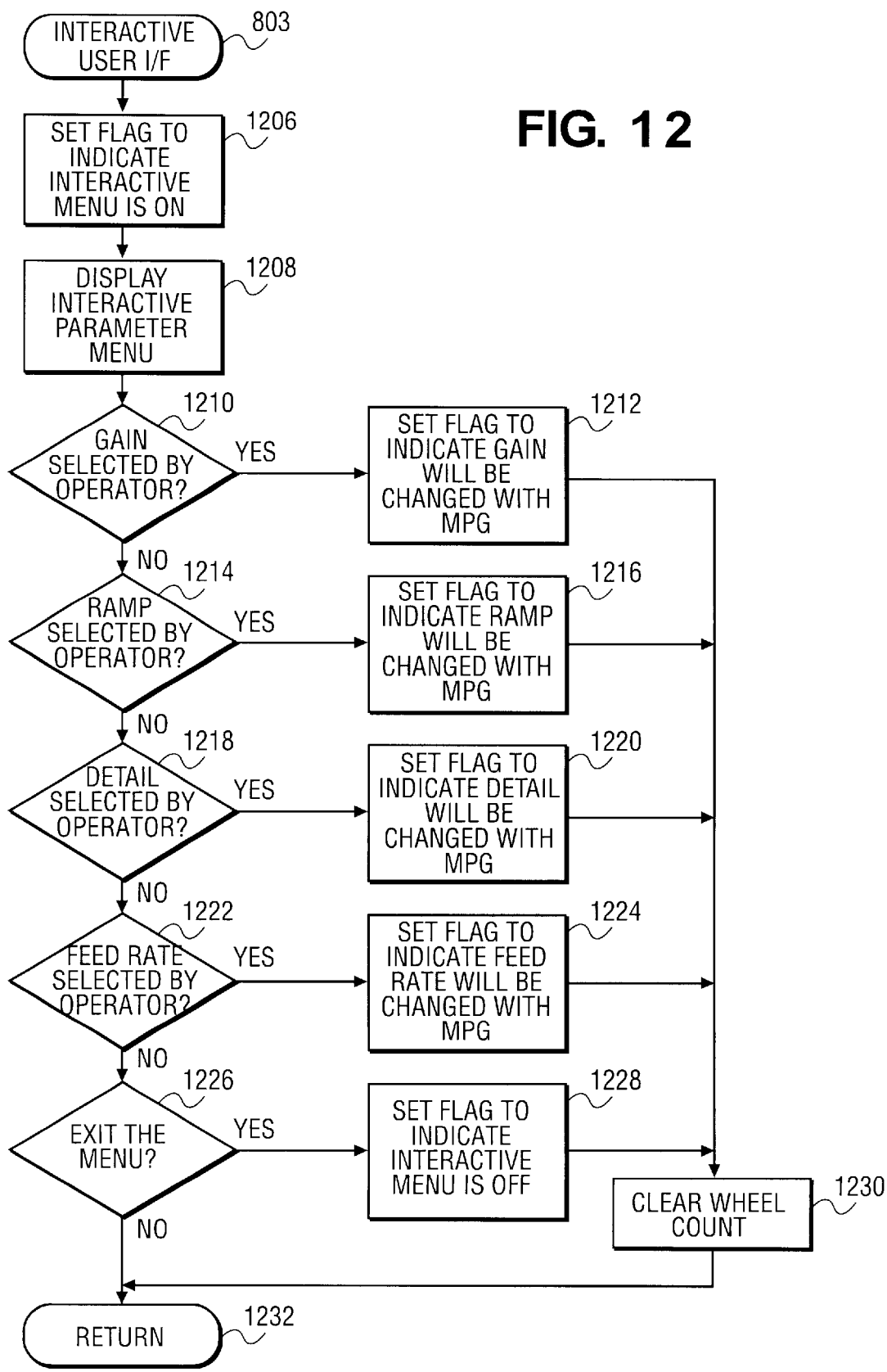
FIG. 12 is a flowchart showing the sequence of steps that are performed when the interactive user interface is activated.

FIG. 12 is a flowchart showing the sequence of steps that are performed when the INTERACTIVE USER I/F routine 803 is accessed. Step 1206 sets a flag to indicate that the interactive user interface menu is ON and Step 1208 displays the interactive user interface menu as shown in FIG. 3. Steps 1210, 1214, 1218 and 1222 determine successively whether GAIN, RAMP TIME, DETAIL, or FEED RATE has been selected from the menu, and corresponding Steps 1212, 1216, 1220 and 1224 set a flag to indicate the IC parameter that has been selected for adjustment with the MPG handwheel. During this corresponding step, the flags associated with the control parameters that were not selected are cleared. To exit the interactive user interface menu, the operator presses a key designated for this function, e.g., an "ESC" key. Step 1226 checks to see if this key has been pressed and, if so, clears the interactive user interface flag, which was set in Step 1206, in Step 1228. The MPG wheelcount is cleared in Step 1230 and the INTERACTIVE USER I/F routine is ended in Step 1232.

FIG. 13 is a flowchart showing the sequence of steps that are performed when an NC block is processed in either Step 406 or Step 422 of FIG. 7 to begin at Step 1300. Step 1302 checks the status of the interactive user interface modification flag. If the flag is ON, the control parameters are modified in accordance with the MODIFY IC PARAMETERS routine 1303 as shown in FIG. 13B.

In the MODIFY IC PARAMETERS routine 1303, Step 1304 determines whether the modification is of a newly selected control parameter or of an already selected control parameter. If the control parameter is newly selected, Step 1306 first displays its value before returning to Step 1308. In Step 1308, the MPG handwheel is checked to see whether it is turning. If so, the selected control parameter is modified in accordance with the number of pulses generated by the MPG handwheel. Otherwise, control returns to Step 1350 of FIG. 13A for further block processing.

Steps 1310, 1320, 1330 and 1340 determine the selected control parameter in accordance with the flags set at Steps 1212, 1216, 1220 and 1224, and Steps 1312, 1322, 1332 and 1342 adjust the selected parameter in accordance with the direction and number of pulses generated by the MPG handwheel. The adjusted value of the selected parameter is displayed in step 1348 and control returns to Step 1350 of FIG. 13A for further block processing.

If the MPG handwheel is turned clockwise, the value of the selected parameter is increased. If the MPG handwheel is turned counterclockwise, the value of the selected parameter is decreased. The adjusted value is then saved to the control parameters table associated with the tool that is mounted in the CNC machine (Steps 1314, 1324, 1334, 1344). In Step 1316, the adjusted value of the gain is stored in the command buffer for future reference by the servo controllers 224 and, in Step 1326, the adjusted value of the feed rate is stored in the command buffer for future reference by the command interpreter 210. The values of the ramp time and detail are retained in the processor memory and are not stored separately in the command buffer.

Figure 13A:
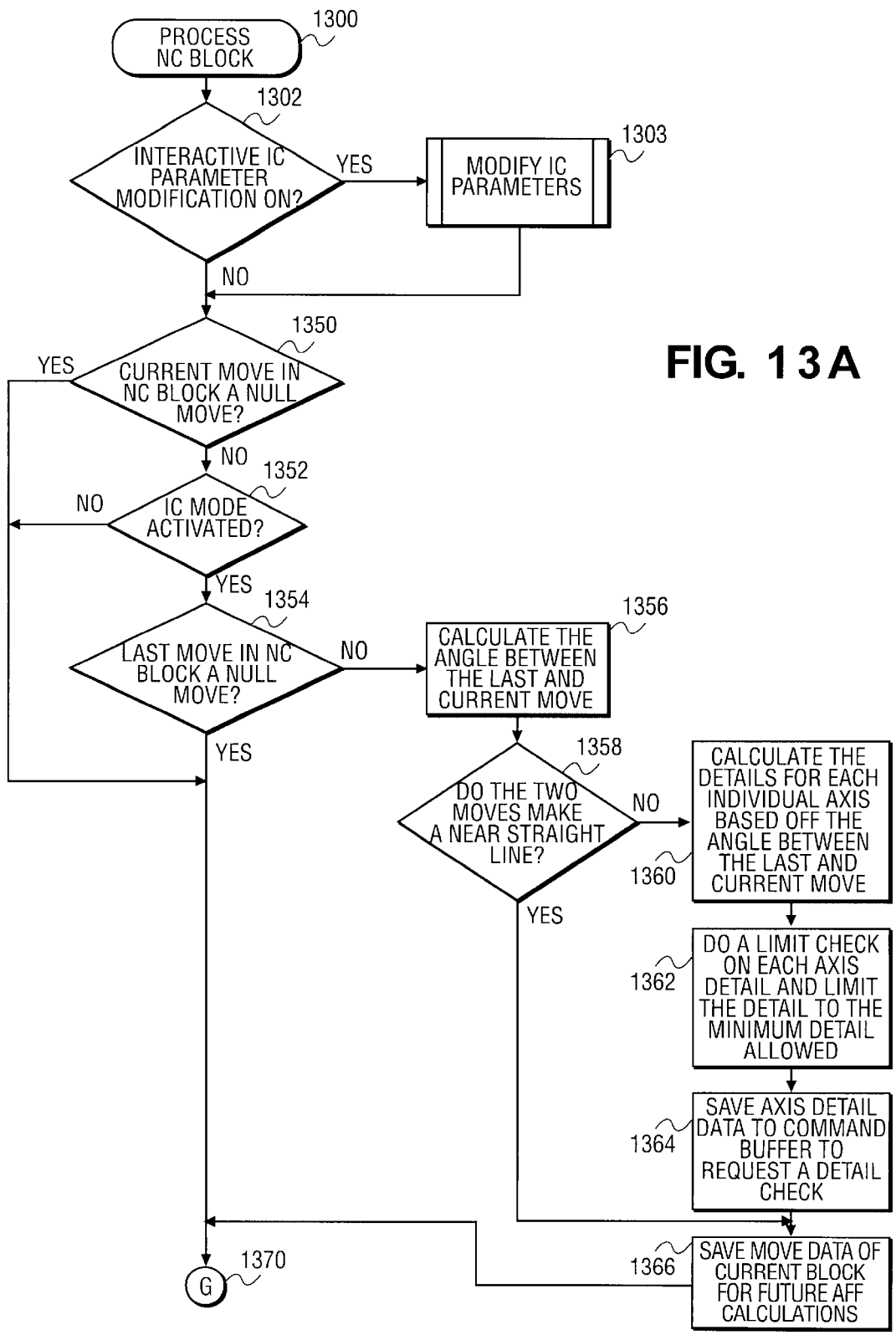

In Step 1350 of FIG. 13A, the sequence of steps for dynamically defining the detail is initiated by first checking to see if the current move in the NC block is for a null move. If it is a null move, i.e., a move with no motion, flow proceeds to node 1370 for further block processing in accordance with FIG. 13C. Flow proceeds to node 1370 also if IC mode has not been activated (Step 1352) or if last move in the NC block is a null move (Step 1354). Otherwise, flow continues to Step 1356, where the angle α between the current move and the last move is determined based on the following equation:

$$\alpha = 180° - \cos^{-1}(a \cdot b / (\|a\| \|b\|))$$

where a is a vector defining the last move and b is the vector defining the current move. For example, if a=1i +1j+1k and b=1i+1j+2k, then:

$$a \cdot b = (1*1+1*1+1*2) = 4$$

$$\|a\| = \text{sqrt}(1^2+1^2+1^2) = 1.73$$

$$\|b\| = \text{sqrt}(1^2+1^2+1^2) = 2.45$$

so $$\alpha = 180° - \cos^{-1}(4/(1.73*2.45)) = 180° - 19.37°$$

or $$\alpha = 160.63°$$

Step 1358 checks to see if the move defined by the last and current moves is essentially along a straight line by inquiring whether the angle between the moves is very close to 180°, e.g., within 0.00057°. If the move is essentially along a straight line, flow proceeds to Step 1366. Step 1366 processes the current block and saves the move data for the current block in the command buffer. Flow then returns to node 1370, where further processing of the NC block is completed.

If the last move and the current move forms a corner, on the other hand, Step 1360 calculates the detail for each of X, Y and Z axes based on the angle α between the last and current moves based on Eqn. 1, where x1, y1, and z1 are respectively X, Y, and Z axes components of the last move vector, and D=D$_0$/sin α, where D$_0$ is the specified detail.

Step 1362 then does a limit check on each axis detail and assigns a minimum value, e.g., 0.0003 in., if any of the axis details is less than the minimum value. Then, in Step 1364, the axis detail as defined above is saved into the command buffer and a detail check command is stored at the beginning of the current NC block (which corresponds to the end of the last NC block) so long as the detail is not greater than 0.025 in. In this manner, the detail check command is inserted between two NC blocks when the moves specified by the two NC blocks define a corner angle. Flow then continues onto Step 1366 which is described above.

Figure 13C:
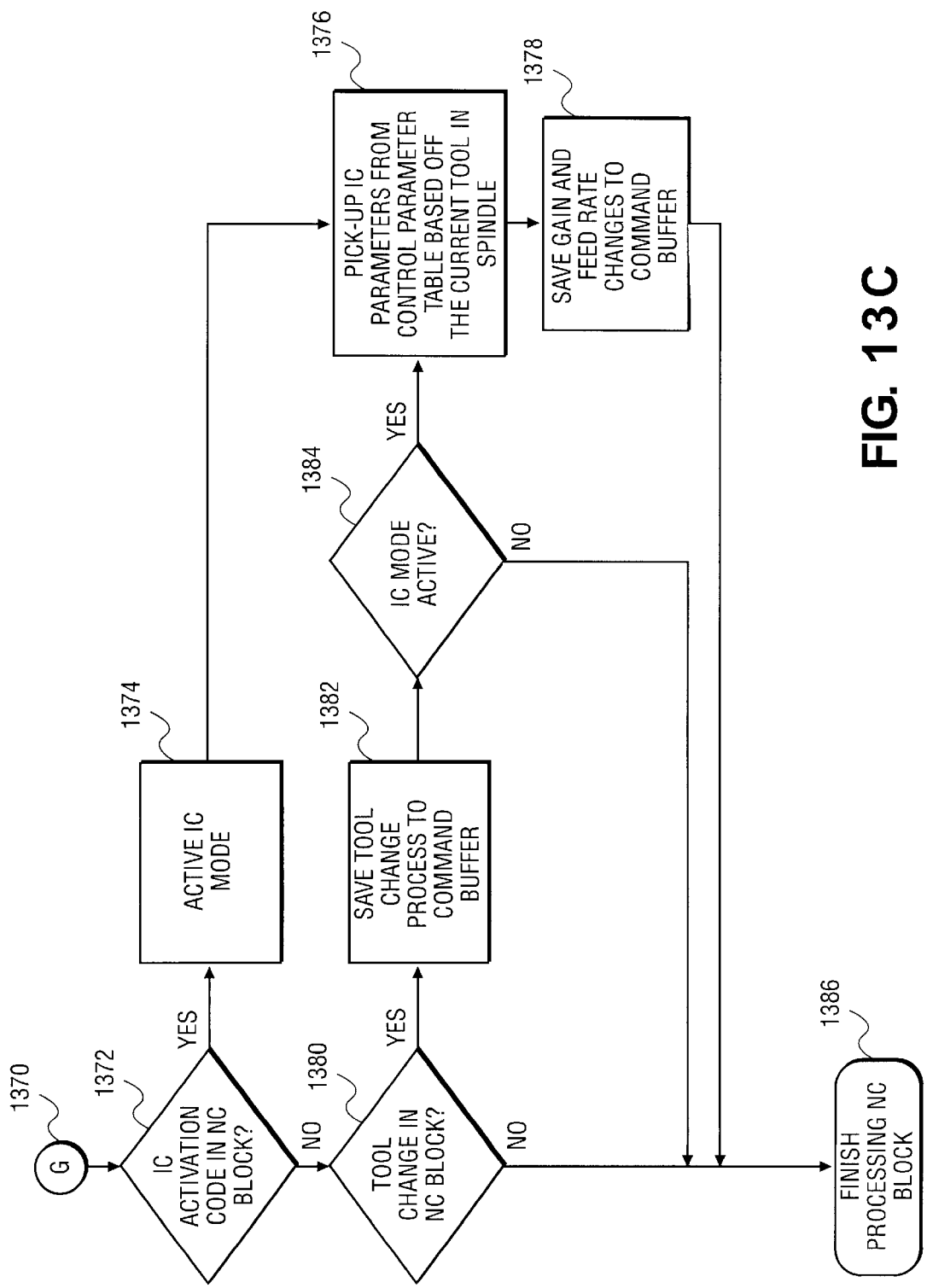

FIG. 13C illustrates the remaining steps in the processing of an NC block. Step 1372 checks to see whether the IC mode was commanded by the current NC block. If so, the IC mode is activated in Step 1374 and the preferred control parameter values corresponding to the tool currently installed in the CNC machine are retrieved from the control parameters table in Step 1376. In Step 1378, the retrieved gain and feed rate values are stored in the command buffer.

Step 1380 checks to see whether a tool change is requested in the current NC block. If so, a tool change process is saved to the command buffer in Step 1382. Then, if the IC mode is recognized as being active in Step 1384, the preferred control parameter values corresponding to the new tool are retrieved in Step 1376. Otherwise, the NC block processing ends in Step 1386.

Figure 14:
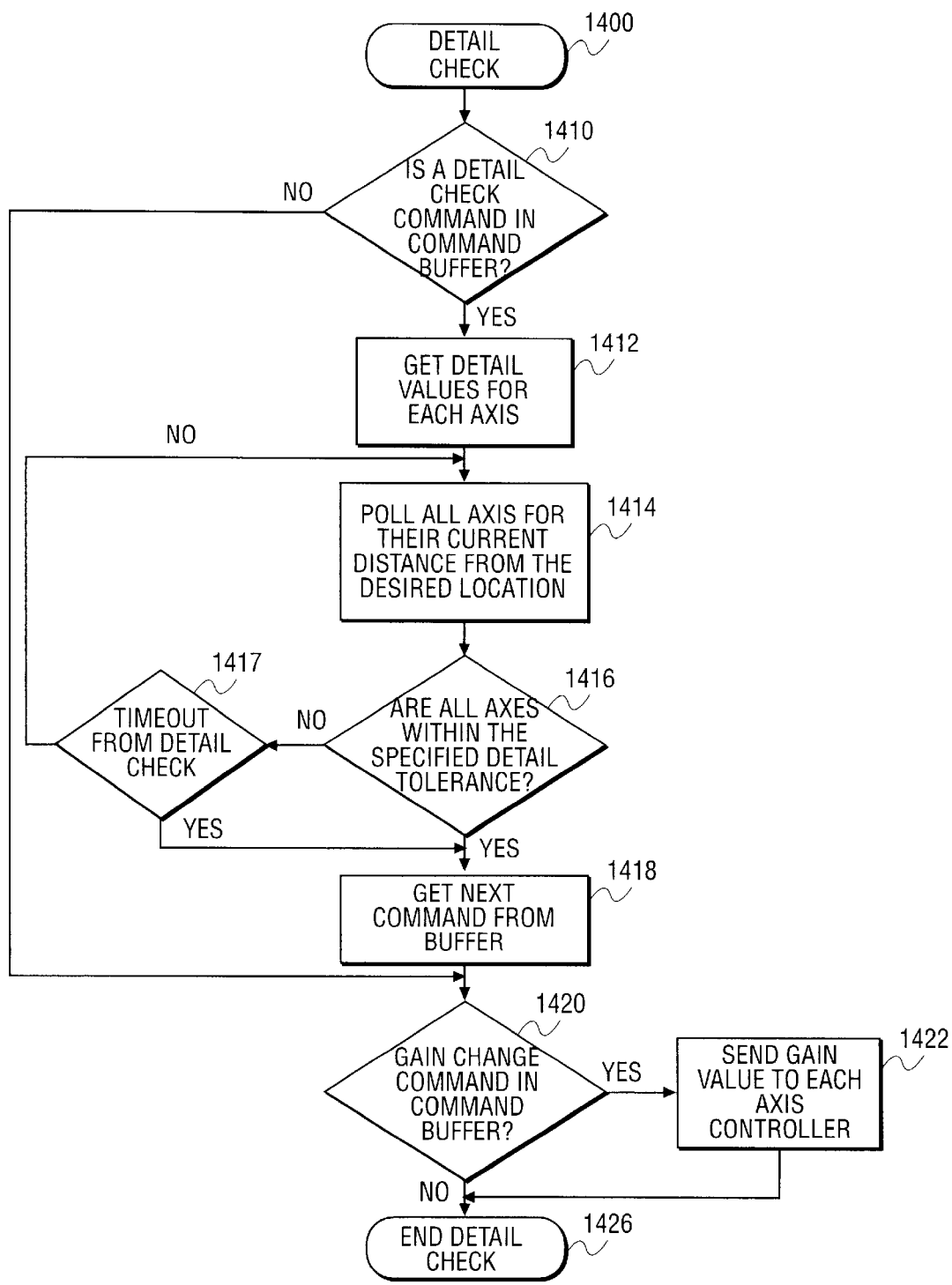
FIG. 14 is a flowchart showing the sequence of steps that are performed during a detail check.

FIG. 14 is a flowchart showing the sequence of steps of the DETAIL CHECK routine 1400, which is invoked to determine whether the following errors of the servo controllers 224 have been reduced to be less than their respective axis detail. Step 1410 checks to see if a detail check command is stored in the command buffer. If not, flow jumps to Step 1420. If a detail check command is stored, detail values for each axis, $D_X$, $D_Y$ and $D_Z$, are retrieved from the command buffer in Step 1412. In Step 1414, the executioner polls the servo controllers 224 for the following error in each of their respective axis. If the following errors in all three axes are within their respective axis detail (Step 1416), the next motion command from the command buffer is retrieved in Step 1418 and flow proceeds to Step 1420.

Otherwise, the executioner continues to poll the servo controllers 224 for the following errors until each axis detail has been satisfied or until time out has been determined in Step 1417. The time out is implemented to prevent prolonged delays from gain that has been set too low or detail that has been set too small. In the preferred embodiment, the time out occurs at 25 ms. Upon time out, the next motion command from the command buffer is retrieved in Step 1418 and flow proceeds to Step 1420.

In Step 1420, the command buffer is checked to see if a gain change is stored therein. If the gain change is stored, Step 1422 first sends the new gain value to each servo controller before ending the detail check in Step 1426.

In the preferred embodiment of the present invention, a point of intersection between two moves is recognized as a corner along the programmed path so long as the angle α formed between the two moves lies between 0.00057° and 179.99943°. In alternative embodiments of the present invention, a point of intersection between two moves is recognized as a corner along the programmed path so long as the angle α formed between the two moves lies between one of the following pairs: 0.1° and 179.9°, 0.5° and 179.5°, 1° and 179°, 10° and 170°, 30° and 150°, and 45° and 135°.

Figure 15:
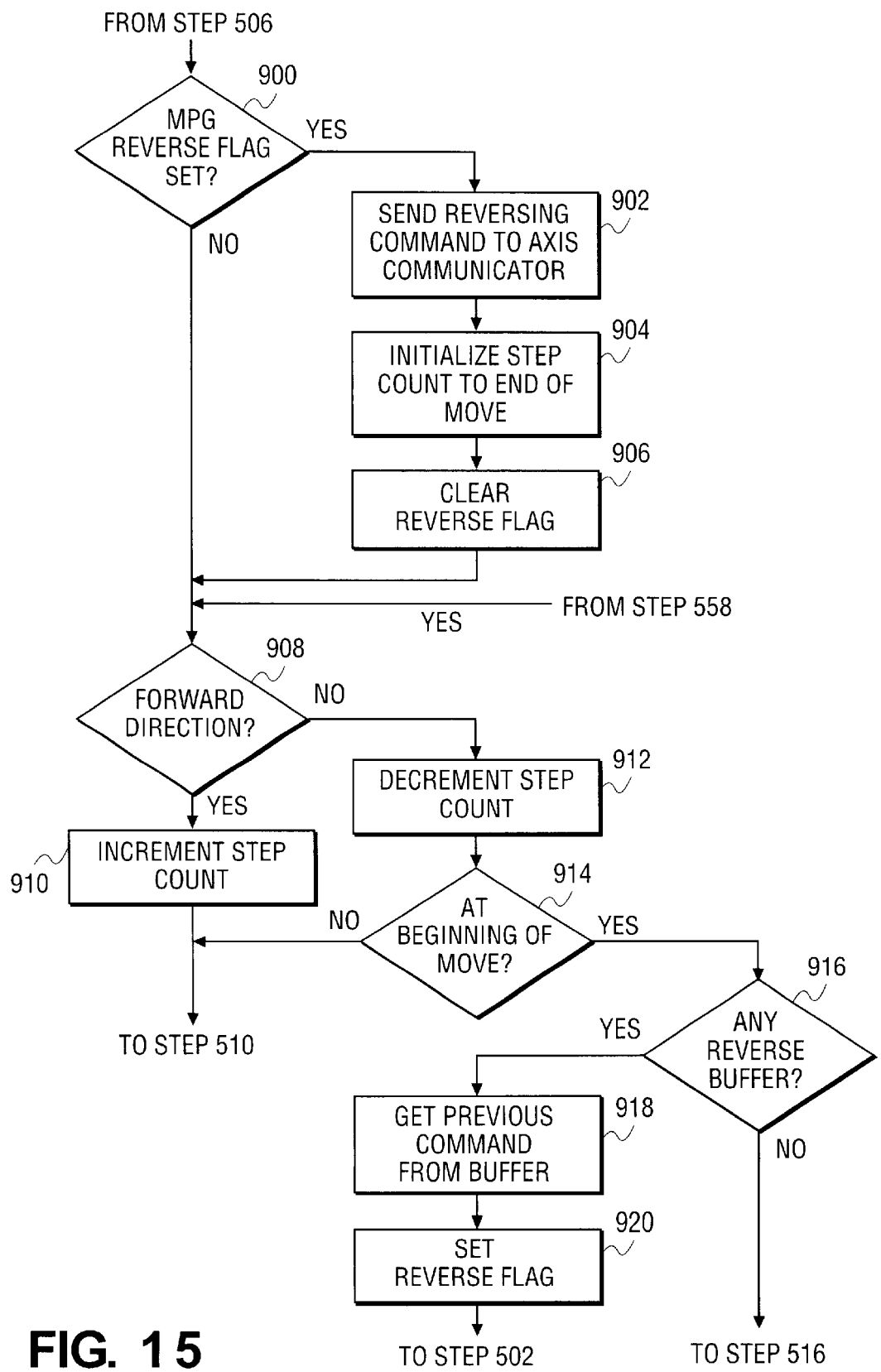
FIG. 15 is a partial flowchart showing modifications which are made to the flowchart of FIG. 8A in accordance with an alternative embodiment of the invention.

Referring now to FIG. 15, a partial flowchart is shown which provides modifications made to the flowchart of FIG. 8A in accordance with another embodiment of the invention. As discussed above, this alternative embodiment provides the operator with the ability to move backwards to previous NC-code blocks that were interpreted and stored into the command and execution buffer 212 without program jumps or calls that would prevent the program from being executed backwards. In combination with FIGS. 8A and 8B, FIG. 15 represents the sequence of steps performed by the master controller during the alternative embodiment of the execution routine, as well as the programmable clock interrupt routine. In brief, FIG. 15 replaces Step 508 of FIG. 8A, which was used to decrement or increment the step count depending upon the current direction for the move.

After the clock in the step frequency generator 220 has been set up in Step 506 for the current programmed feed rate, control proceeds to Step 900 to see if an MPG reverse flag was previously set, which would have occurred if the previous step was decremented at the beginning of a move, as described below. If the reverse flag was set, Step 902 sends the reversing command to the axis communicator 216 in order to instruct the machine slide to move in the reverse direction. In Step 904, the step count is initialized to the end of the move. For example, if there were 900 steps to complete the move, the step count would be set to 900 so it could be decremented below. The MPG reverse flag is then cleared in Step 906, and control proceeds to Step 908.

If Step 900 finds that the MPG reverse flag was not previously set, or upon returning from clearing the reverse flag in Step 906, or upon the completion of taking a step in Step 558 of the programmable clock interrupt routine, control proceeds to Step 908 where the direction of the MPG handwheel is checked. If the MPG handwheel is being turned in a clockwise or forward direction, the step count is incremented in Step 910 and control proceeds to check whether the end of the move has occurred in Step 510. If the MPG handwheel is being turned in a counterclockwise or reverse direction, the step count is decremented in Step 912 and control proceeds to check whether the beginning of the move has been reached.

Step 914 returns control to Step 510 if not at the beginning of a move, in order to again check for the end of the move in Step 510. If, however, the step count has been decremented to zero indicating the beginning of a move, then Step 916 checks to see if any reverse buffer remains, i.e., whether the command and execution buffer 212 still has the motion command data stored for the previous block of NC-code. If it does not, i.e., if the previous motion commands are no longer in the command buffer, then control is returned from the execution routine or programmable clock interrupt at Step 516. If there is previous motion command data in the buffer, Step 918 obtains this data from the buffer for execution on the next interrupt. The MPG reverse flag is then set in Step 920, and control is returned to Step 502 of the execution routine to set up for the next move.

As can now be seen, FIG. 15 returns control to Step 516 if the previous motion command information is no longer in the command buffer. If it is desired that the program go back and retrieve previous blocks of NC-code from the NC-code memory 230 and re-interpret and re-load them in reverse order into the command and execution buffer 212, then an appropriate routine would be added after Step 916 to do so. If a reverse program thread of any jumps or calls was previously set up, then such a thread would be followed backwards in the program at either Step 918 or after Step 916. These two additional modifications (not shown) would permit the operator to run backwards through the entire NC-code program if desired.

In review, it can now be seen that the present invention provides a CNC machine that redefines a detail as a function of the corner angle based on a recognition that corners having angles not equal to 90° have effective corner tolerances that are equal to the corner tolerance specified by the operator divided by the sine of the corner angle. An increase in machining speed is achieved, because, at corner angles not equal to 90°, the redefined corner tolerance is larger than the operator-specified corner tolerance and the CNC machine is permitted to machine the corner at an earlier time than conventional CNC machines.

Furthermore, the present invention provides the operator with interactive control of the parameters that control the speed and accuracy of machining. The operator is therefore able to observe the effects of changing the control parameters on the speed and accuracy of machining, and to customize the control parameters to a particular type of tool or application based on the observations.

While specific embodiments of the present invention have been shown and described herein, further modifications and improvements may be made by those skilled in the art. In particular, it should be noted that the type of handwheel shown in the figures was chosen in the preferred embodiment only as a representative control mechanism which was readily available in the particular application. However, any input device that could provide information to the computer which therefore results in speed compensation and/or program execution forward or backward could be used. For example, a different type of handwheel, a knob, a joystick, a mouse, a trackball, a touch screen, or even voice recognition or virtual reality control systems may be employed to provide the interactive control of the CNC machine. Furthermore, the actual NC-code described in the flowcharts are only preferred embodiments of codes which can be used to program CNC machine tools. Numerous other hardware and software modifications may also be made to customize the present invention for various other applications. All such modifications which retain the basic underlying principles disclosed and claimed herein are within the scope and spirit of the invention.

We claim:

1. In a positioning device, a method of moving a tool relative to a workpiece along a programmed path, the method comprising the steps of:
    (a) specifying a tolerance;
    (b) executing the programmed move to generate a sequence of move command signals, each move command signal indicating a desired position of the tool relative to the platform along the programmed path;
    (c) moving the tool relative to the platform through a sequence of incremental moves in accordance with the move command signals, wherein, if the desired position indicated by a current move command signal is a corner on the programmed path, moving the tool relative to the platform along the programmed path until the position of the tool relative to the platform is within an allowable distance from the corner, and once the position of the tool relative to the platform is within the allowable distance from the corner, moving the tool relative to the platform towards a point on the programmed path beyond the corner in accordance with a next move command signal,
    wherein the allowable distance is larger than the specified tolerance.

2. The method according to claim 1, wherein the allowable distance is derived as a function of the specified tolerance and an angle of the corner.

3. In a positioning device, a method of moving a tool relative to a workpiece along a programmed path, the method comprising the steps of:
    (a) specifying a tolerance;
    (b) executing the programmed move to generate a sequence of move command signals, each move command signal indicating a desired position of the tool relative to the platform along the programmed path;
    (c) moving the tool relative to the platform through a sequence of incremental moves in accordance with the move command signals, wherein, if the desired position indicated by a current move command signal is a corner on the programmed path, moving the tool relative to the platform along the programmed path until the position of the tool relative to the platform is within an allowable distance from the corner, and once the position of the tool relative to the platform is within the allowable distance from the corner, moving the tool relative to the platform in accordance with a next move command signal; and
    (d) interactively modifying the specified tolerance during the step of moving, wherein the allowable distance is larger than the specified tolerance, and
    wherein the allowable distance is derived as a function of the specified tolerance and an angle of the corner.

4. In a positioning device, a method of moving a tool relative to a workpiece along a programmed path, the method comprising the steps of:
    (a) specifying a tolerance;
    (b) executing the programmed move to generate a sequence of move command signals, each move command signal indicating a desired position of the tool relative to the platform along the programmed path;
    (c) moving the tool relative to the platform through a sequence of incremental moves in accordance with the move command signals, wherein, if the desired position indicated by a current move command signal is a corner on the programmed path, moving the tool relative to the platform along the programmed path until the position of the tool relative to the platform is within an allowable distance from the corner, and once the position of the tool relative to the platform is within the allowable distance from the corner, moving the tool relative to the platform in accordance with a next move command signal,
    wherein the allowable distance is larger than the specified tolerance, and wherein each step of incremental moving includes the steps of producing a position correction signal based on a difference between a current position of the tool relative to the platform and the desired position indicated by the current move command, and moving the tool relative to the platform to a desired velocity based on the position correction signal.

5. The method according to claim 4, wherein each step of incremental moving further includes the steps of producing a velocity correction signal based on a difference between a current velocity signal of the tool relative to the platform and the position correction signal, and moving the tool relative to the platform based on the velocity correction signal.

6. The method according to claim 5, further comprising the step of interactively modifying a gain during the step of moving, wherein the gain represents sensitivity of the position correction signal to the difference between the current and desired positions of the tool relative to the platform.

7. In a positioning device, a method of moving a tool relative to a workpiece along a programmed path, the method comprising the steps of:
    (a) specifying a tolerance;

(b) executing the programmed move to generate a sequence of move command signals, each move command signal indicating a desired position of the tool relative to the platform along the programmed path;

(c) moving the tool relative to the platform through a sequence of incremental moves in accordance with the move command signals, wherein, if the desired position indicated by a current move command signal is a corner on the programmed path, moving the tool relative to the platform along the programmed path until the position of the tool relative to the platform is within an allowable distance from the corner, and once the position of the tool relative to the platform is within the allowable distance from the corner, moving the tool relative to the platform in accordance with a next move command signal; and (d) interactively modifying a programmed feed rate during the step of executing, wherein programmed feed rates are adjusted in accordance with the modified programmed feed rate and the adjusted programmed feed rates are employed during the step of executing, wherein the allowable distance is larger than the specified tolerance.

8. In a CNC machine, a method of cutting a corner portion of a workpiece to a specified tolerance, the method comprising the steps of:

(a) cutting along a programmed cutting path toward a corner of the programmed cutting path; and (b) when the cut specified in step (a) is within an allowable distance from the corner that is larger than the specified tolerance, cutting towards a point on the programmed path beyond the corner.

9. The method according to claim 8, wherein the allowable distance is equal to the specified tolerance divided by the sine of the angle of the corner.

10. The method according to claim 8, further comprising the step of programming the cutting path.

11. The method according to claim 8, wherein the step of cutting includes the steps of:

generating a desired position of the cut that is ahead of a current position of the cut;

determining a velocity of the cut based on a specified gain and a difference between the desired position and the current position; and controlling an actual velocity of the cut to be equal to the determined velocity of the cut.

12. The method according to claim 11, further comprising the step of interactively modifying one of the specified tolerance and the specified gain during the step of cutting.

13. A CNC machine for cutting a corner portion of a workpiece, comprising:

a tool;

a platform;

a programmable control unit programmed to control the movement of the tool relative to the platform along a programmed path;

a drive assembly connected to at least one of the tool and the platform to move the tool relative to the platform along the programmed path, wherein, once the drive assembly moves the tool relative to the platform to a position that is within an allowable distance from a corner of the programmed path, the tool is moved relative to the platform towards a point on the programmed path beyond the corner, wherein the allowable distance varies with respect to an angle of the corner.

14. The CNC machine according to claim 13, wherein the allowable distance is derived as a function of a tolerance specified for corner cuts divided by the sine of the angle of the corner.

15. The CNC machine according to claim 13, wherein the programmable control unit generates a desired position of the tool relative to the platform at a location that is ahead of a current position thereof, and the drive assembly includes a servo controller which determines a velocity of the tool relative to the platform based on a difference between the desired position and the current position.

16. The CNC machine according to claim 15, wherein the drive assembly further includes an amplifier which controls an actual velocity of the tool relative to the platform to be equal the velocity determined by the servo controller.

17. The CNC machine according to claim 13, further comprising an interactive user interface permitting adjustments to a control parameter that affects the movement of the tool relative to the platform along the programmed path, and a handwheel for adjusting the control parameter in accordance with a rotation of the handwheel.

18. The CNC machine according to claim 17, wherein the control parameter includes a tolerance specified for corner cuts and the allowable distance is larger than the specified tolerance.

19. The CNC machine according to claim 18, wherein the drive assembly moves the tool relative to the platform with a velocity that is determined with respect to a specified gain of the drive assembly, and wherein the programmable control unit limits the programmed acceleration of the tool relative to the platform based on a specified ramp time.

20. The CNC machine according to claim 19, wherein the control parameter includes one of the specified tolerance, the specified gain, the specified ramp time, and the specified programmed feed rate, and the programmable control unit stores the values of the control parameters in a control parameters table at a position reserved for the tool currently mounted in the CNC machine.

21. A method of machining a workpiece within a specified tolerance by moving either a tool or a workpiece platform relative to each other along a programmed path, the method comprising the steps of:

(a) generating a sequence of move command signals, each move command signal indicating a desired position of the tool relative to the platform along the programmed path; and (b) moving the either the tool or the platform relative to each other through a sequence of incremental moves in accordance with the move command signals, characterized in that, if the programmed path includes a corner, following the current move command signal until the position of the tool relative to the platform is within an allowable distance from the corner, and then deviating from the programmed path in a linear direction towards a position on the programmed path beyond the corner to follow the next move command signal, wherein the allowable distance varies in accordance with the angle of the corner.

* * * * *